United States Patent
Park

(10) Patent No.: US 11,761,138 B2
(45) Date of Patent: Sep. 19, 2023

(54) LAUNDRY TREATING APPARATUS

(71) Applicant: LG ELECTRONICS INC., Seoul (KR)

(72) Inventor: Junghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 46 days.

(21) Appl. No.: 17/401,763

(22) Filed: Aug. 13, 2021

(65) Prior Publication Data

US 2022/0049405 A1    Feb. 17, 2022

(30) Foreign Application Priority Data

Aug. 14, 2020    (KR) .......................... 10-2020-0102614

(51) Int. Cl.
*D06F 37/40*    (2006.01)
*D06F 37/12*    (2006.01)

(52) U.S. Cl.
CPC .............. *D06F 37/40* (2013.01); *D06F 37/12* (2013.01)

(58) Field of Classification Search
CPC ........ D06F 13/02; D06F 17/10; D06F 39/024; D06F 37/40; D06F 39/088; D06F 37/12; D06F 37/24
USPC ......................................................... 68/23.6
See application file for complete search history.

(56) References Cited

U.S. PATENT DOCUMENTS

| | | | |
|---|---|---|---|
| 2,150,654 A | | 3/1939 | Geldhof |
| 3,987,652 A | * | 10/1976 | Ruble .................... D06F 13/00 68/134 |
| 4,068,503 A | * | 1/1978 | Platt ........................ D06F 13/00 68/133 |
| 4,402,198 A | * | 9/1983 | Cartier .................... D06F 13/02 68/53 |
| 4,417,457 A | * | 11/1983 | Brenner ................ D06F 39/024 68/17 A |
| 4,718,258 A | * | 1/1988 | Mason .................... D06F 37/40 74/21 |
| 4,787,220 A | * | 11/1988 | Noh ........................ D06F 13/02 68/134 |
| 4,856,303 A | * | 8/1989 | Hood, Jr. ................ D06F 37/40 74/572.4 |

(Continued)

FOREIGN PATENT DOCUMENTS

KR    100296801    10/2001

OTHER PUBLICATIONS

PCT International Search Report and Written Opinion in International Appln No. PCT/KR2021/010147, dated Nov. 25, 2021, 9 pages.

*Primary Examiner* — Michael E Barr
*Assistant Examiner* — Thomas Bucci
(74) *Attorney, Agent, or Firm* — Fish & Richardson P.C.

(57) ABSTRACT

Disposed is a laundry treating apparatus having a rotator. The rotator includes a bottom portion positioned on a bottom surface of a drum, a pillar protruding from the bottom portion toward an open surface of the drum, wherein the pillar is formed in a hollow shape, a blade protruding from an outer circumferential surface of the pillar, wherein the blade extends from one end thereof facing toward the bottom surface to the other end thereof facing toward the open surface, and a cap coupled to an end of the pillar to close an interior of the pillar, and the blade is disposed such that the other end thereof is spaced apart from the cap. Accordingly, it is possible to minimize deformation of the pillar in manufacturing the rotator.

17 Claims, 23 Drawing Sheets

(56) References Cited

U.S. PATENT DOCUMENTS

| | | | | |
|---|---|---|---|---|
| 4,920,770 | A * | 5/1990 | Dooley | D06F 13/02 68/133 |
| 5,044,178 | A * | 9/1991 | Altnau, Sr. | D06F 39/024 68/17 A |
| 2004/0016267 | A1 * | 1/2004 | Clark | D06F 13/02 68/133 |
| 2018/0155864 | A1 * | 6/2018 | Alexander | D06F 39/022 |

* cited by examiner

Length

Length

Length

Length

Length

Length

Length

LAUNDRY TREATING APPARATUS

CROSS-REFERENCE TO RELATED APPLICATIONS

This application claims the benefit of Korean Patent Application No. 10-2020-0102614, filed on Aug. 14, 2020, which is hereby incorporated by reference as if fully set forth herein.

BACKGROUND

Field

The present disclosure relates to a laundry treating apparatus, and more particularly, to a laundry treating apparatus having a rotator disposed in a drum.

Discussion of the Related Art

A laundry treating apparatus is an apparatus that puts clothes, bedding, and the like (hereinafter, referred to as laundry) into a drum to remove contamination from the laundry. The laundry treating apparatus may perform processes such as washing, rinsing, dehydration, drying, and the like. The laundry treating apparatuses may be classified into a top loading type laundry treating apparatus and a front loading type laundry treating apparatus based on a scheme of putting the laundry into the drum.

The laundry treating apparatus may include a housing forming an appearance of the laundry treating apparatus, a tub accommodated in the housing, a drum that is rotatably mounted inside the tub and into which the laundry is put, and a detergent feeder that feeds detergent into the drum.

When the drum is rotated by a motor while wash water is supplied to the laundry accommodated in the drum, dirt on the laundry may be removed by friction with the drum and the wash water.

In one example, a rotator may be disposed inside the drum to improve a laundry washing effect. The rotator may be rotated inside the drum to form a water flow, and the laundry washing effect may be improved by the rotator.

Korean Patent No. 10-0186729 discloses a laundry treating apparatus including a rotator disposed inside a drum. The laundry treating apparatus improves a washing efficiency by rotating the rotator to form a water flow.

An efficient design is required for the rotator such that the water flow formed by the rotation may improve the washing efficiency. Furthermore, a design that may effectively reduce a load on a motor by effectively reducing a load on the rotation of the rotator is required.

Therefore, it is an important task in the art to design the rotator such that the rotator may rotate to effectively improve the washing efficiency and the load on the rotation of the rotator may be effectively reduced.

In one example, the rotator may be manufactured by injection molding. In the injection molding, a molding material supplied from a hopper is transferred to a screw at a tip of a cylinder while being mixed in a heating cylinder. In the process, the material may be brought into a uniform plasticized state. When a certain amount of material accumulates at the tip of the screw, the screw may be stopped, and a material molten in a mold closed by a mold clamping device may be injected at high pressure by an injection cylinder.

In a case of a product manufactured by the injection molding, deformation may occur during a cooling process. Accordingly, the rotator is required to be manufactured in a form that may minimize the deformation in the manufacturing.

SUMMARY

Embodiments of the present disclosure are intended to provide a laundry treating apparatus including a rotator that forms a water flow that may effectively improve a washing efficiency.

In addition, embodiments of the present disclosure are intended to provide a laundry treating apparatus that may improve an economic feasibility by reducing use of a material in a manufacture of the rotator as a pillar is formed in a hollow shape.

In addition, embodiments of the present disclosure are intended to provide a laundry treating apparatus in which a blade is spaced apart from one end of a pillar, thereby minimizing deformation of the pillar during manufacturing.

In addition, embodiments of the present disclosure are intended to provide a laundry treating apparatus that may increase a coupling force between the pillar and a cap by minimizing the deformation of the pillar during the manufacturing of the rotator.

A rotator disposed inside a drum may include a bottom portion and a pillar. The pillar may also be referred to as an agitator. The rotator according to an embodiment of the present disclosure may improve a washing efficiency and implement a washing scheme differentiated from a conventional scheme.

The bottom portion may also be referred to as a pulsator. In one embodiment of the present disclosure, a protrusion portion of the bottom portion may be constructed to have a shape of a whale tail and reduce resistance to water when rotating.

The protrusion portion of the bottom portion and the blade of the pillar may together form water flows at an upper portion and a lower portion of an interior of the drum together, thereby forming a differentiated water flow inside the drum and effectively improving a washing efficiency.

The rotator may be manufactured by injection molding, and the blade may be manufactured to be spaced apart from a cap, so that deformation of a portion thereof where the cap of the pillar is coupled may be prevented as much as possible.

A laundry treating apparatus may include a tub for providing therein a space for water to be stored, a drum rotatably disposed inside the tub, wherein the drum includes an open surface for inserting and withdrawing laundry therethrough and a bottom surface located on an opposite side of the open surface, and a rotator rotatably disposed on the bottom surface and inside the drum.

The rotator may include a bottom portion positioned on the bottom surface, a pillar protruding from the bottom portion toward the open surface, wherein the pillar is formed in a hollow shape, a blade protruding from an outer circumferential surface of the pillar, wherein the blade extends from one end thereof facing toward the bottom surface to the other end thereof facing toward the open surface, and a cap coupled to an end of the pillar to close an interior of the pillar. The blade may be disposed such that the other end thereof is spaced apart from the cap.

In addition, the blade and the pillar may be formed integrally, and a thickness of the blade may be different from a thickness of the pillar.

In addition, the pillar may include a pillar main body protruding from a center of the bottom portion and formed in a hollow shape, wherein the blade is disposed on an outer circumferential surface of the pillar main body, and a cap-coupled-portion extending from the pillar main body toward the open surface to be coupled to the cap.

In addition, the other end may be disposed to be spaced apart from a contact surface of the pillar main body and the cap-coupled-portion by a predetermined distance in a longitudinal direction of the pillar.

In addition, the cap-coupled-portion may be formed in a hollow shape, and an outer diameter of the cap-coupled-portion may be smaller than an outer diameter of the pillar main body.

In addition, the cap-coupled-portion may include a plurality of cap-coupled-main bodies disposed to be spaced apart from each other along a circumference of the pillar main body, each hook coupling portion disposed between a pair of the plurality of cap-coupled-main bodies, and a hook protrusion protruding from the hook coupling portion in a radial direction of the cap-coupled-main body.

In addition, the hook coupling portion may have one end facing toward the open surface as a free end, and the other end facing toward the bottom surface as a fixed end, and the hook protrusion may be disposed at the one end of the hook coupling portion.

In addition, an inner circumferential surface of the cap-coupled-portion may form one continuous surface with an inner circumferential surface of the pillar main body.

In addition, an outer circumferential surface of the cap may form one continuous surface with the outer circumferential surface of the pillar main body.

In addition, the cap may include a cap fitting portion coupled to the cap-coupled-portion, and a cap closing portion extending from the cap fitting portion to close an interior of the pillar main body. The cap fitting portion may be coupled to the cap-coupled-portion so as to be spaced apart from the other end by the predetermined distance in the longitudinal direction of the pillar.

In addition, the predetermined distance may increase as a difference between the thickness of the blade and a thickness of the pillar main body increases.

In addition, the predetermined distance may be at least twice the difference between the thickness of the blade and a thickness of the pillar main body.

In addition, the predetermined distance may be smaller than a length of the cap in the longitudinal direction of the pillar.

In addition, the bottom portion may include a protrusion portion protruding from the bottom portion toward the open surface, wherein the protrusion generates a water flow together with the blade.

In addition, the protrusion portion may include a plurality of main protrusions extending along a radial direction of the bottom portion, wherein the plurality of main protrusions are disposed to be spaced apart from each other along a circumferential direction of the bottom portion.

In addition, the main protrusion may extend such that an inner end thereof faces toward a center of the bottom portion, the outer end thereof faces toward a circumference of the bottom portion, and a height thereof from the bottom surface decreases from the inner end to the outer end.

In addition, said one end of the blade may be disposed to be spaced apart from the inner end.

In addition, the blade may include a plurality of blades disposed to be spaced apart from each other along a circumferential direction of the pillar, wherein the blade extends from said one end thereof to the other end thereof to be inclined to one side with respect to a longitudinal direction of the pillar.

In addition, the pillar may include a pillar protrusion protruding from the end of the pillar in a radial direction of the pillar.

According to embodiments of the present disclosure, it is possible to provide the laundry treating apparatus including the rotator that forms the water flow that may effectively improve the washing efficiency.

In addition, according to embodiments of the present disclosure, it is possible to provide the laundry treating apparatus that may secure the economic feasibility by minimizing the amount of material used when manufacturing the rotator.

In addition, according to embodiments of the present disclosure, it is possible to provide the laundry treating apparatus that may minimize the deformation of the pillar during manufacturing of the rotator.

In addition, according to embodiments of the present disclosure, it is possible to provide the laundry treating apparatus that may provide the strong coupling force with the cap by minimizing the deformation of the pillar.

DESCRIPTION OF SPECIFIC EMBODIMENTS

Figure 1:
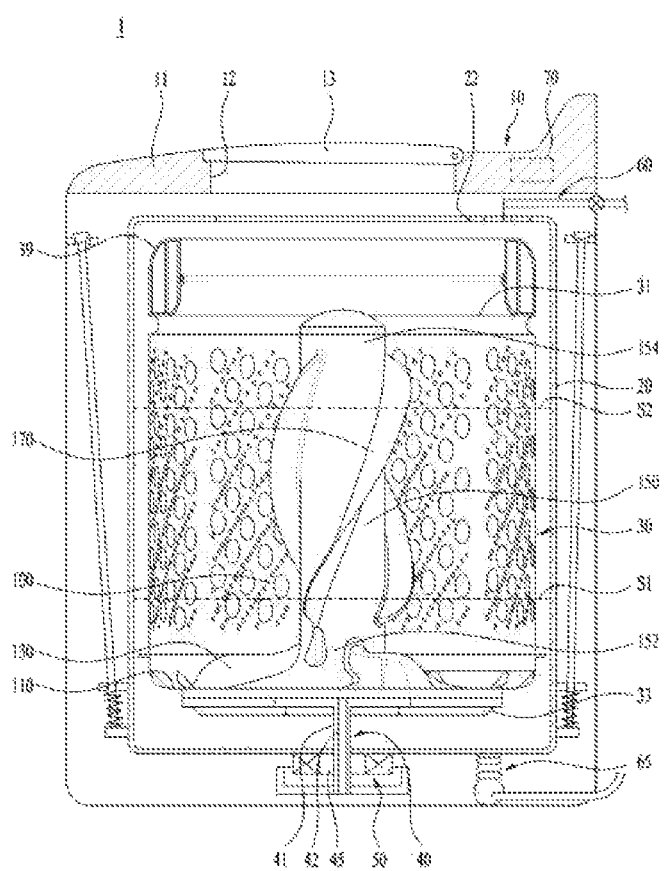
FIG. 1 is a view showing an interior of a laundry treating apparatus according to an embodiment of the present disclosure.

Hereinafter, an embodiment of the present disclosure will be described in detail with reference to the accompanying drawings such that a person having ordinary knowledge in the technical field to which the present disclosure belongs may easily implement the embodiment.

However, the present disclosure is able to be implemented in various different forms and is not limited to the embodiment described herein. In addition, in order to clearly describe the present disclosure, components irrelevant to the description are omitted in the drawings. Further, similar reference numerals are assigned to similar components throughout the specification.

Duplicate descriptions of the same components are omitted herein.

In addition, it will be understood that when a component is referred to as being 'connected to' or 'coupled to' another component herein, it may be directly connected to or coupled to the other component, or one or more intervening components may be present. On the other hand, it will be understood that when a component is referred to as being 'directly connected to' or 'directly coupled to' another component herein, there are no other intervening components.

The terminology used in the detailed description is for the purpose of describing the embodiments of the present disclosure only and is not intended to be limiting of the present disclosure.

As used herein, the singular forms 'a' and 'an' are intended to include the plural forms as well, unless the context clearly indicates otherwise.

It should be understood that the terms 'comprises', 'comprising', 'includes', and 'including' when used herein, specify the presence of the features, numbers, steps, operations, components, parts, or combinations thereof described herein, but do not preclude the presence or addition of one or more other features, numbers, steps, operations, components, or combinations thereof.

In addition, in this specification, the term 'and/or' includes a combination of a plurality of listed items or any of the plurality of listed items. In the present specification, 'A or B' may include 'A', 'B', or 'both A and B'.

FIG. 1 shows that a laundry inlet 12 is defined in a top surface 11 of a cabinet 10 according to an embodiment of the present disclosure, and a laundry door 13 for opening and closing the laundry inlet 12 is disposed on the top surface 11. However, the laundry inlet 12 and the laundry door 13 are not necessarily limited to being defined in and disposed on the top surface 11 of the cabinet 10.

A tub 20 is means for storing water necessary for washing laundry. The tub 20 may have a tub opening 22 defined therein in communication with the laundry inlet 12. For example, one surface of the tub 20 may be opened to define the tub opening 22. At least a portion of the tub opening 22 may be positioned to face the laundry inlet 12, so that the tub opening 22 may be in communication with the laundry inlet 12.

FIG. 1 shows a top loading type laundry treating apparatus 1 according to an embodiment of the present disclosure. Therefore, FIG. 1 shows that a top surface of the tub 20 is opened to define the tub opening 22, and the tub opening 22 is positioned below the laundry inlet 12 and in communication with the laundry inlet 12.

The tub 20 is fixed at a location inside the cabinet 10 through a tub support. The tub support may be in a structure capable of damping vibrations generated in the tub 20.

The tub 20 is supplied with water through a water supply 60. The water supply 60 may be composed of a water supply pipe that connects a water supply source with the tub 20, and a valve that opens and closes the water supply pipe.

The laundry treating apparatus 1 according to an embodiment of the present disclosure may include a detergent feeder that stores detergent therein and is able to supply the detergent into the tub 20. As the water supply 60 supplies water to the detergent feeder, the water that has passed through the detergent feeder may be supplied to the tub 20 together with the detergent.

In addition, the laundry treating apparatus 1 according to an embodiment of the present disclosure may include a water sprayer that sprays water into the tub 20 through the tub opening 22. The water supply 60 may be connected to the water sprayer to supply water directly into the tub 20 through the water sprayer.

The water stored in the tub 20 is discharged to the outside of the cabinet 10 through a drain 65. The drain 65 may be composed of a drain pipe that guides the water inside the tub 20 to the outside of the cabinet 10 and a drain pump disposed on the drain pipe.

The drum 30 may be rotatably disposed inside the tub 20. The drum 30 may be constructed to have a circular cross-section in order to be rotatable inside the tub 20. For example, the drum 30 may be in a cylindrical shape as shown in FIG. 1.

The drum 30 may have a drum opening defined therein positioned below the tub opening 22 to communicate with the inlet. One surface of the drum 30 may be opened to define an open surface 31 as will be described later, and the open surface 31 may correspond to the drum opening.

A plurality of drum through-holes that communicate an interior and an exterior of the drum 30 with each other, that is, the interior of the drum 30 and an interior of the tub 20 divided by the drum 30 with each other may be defined in an outer circumferential surface of the drum 30. Accordingly, the water supplied into the tub 20 may be supplied to the interior of the drum 30 in which the laundry is stored through the drum through-holes.

The drum 30 may be rotated by a driver 50. The driver 50 may be composed of a stator fixed at a location outside the tub 20 and forming a rotating magnetic field when a current is supplied, a rotor rotated by the rotating magnetic field, and a rotation shaft 40 disposed to penetrate the tub 20 to connect the drum 30 and the like to the rotor.

As shown in FIG. 1, the rotation shaft 40 may be disposed to form a right angle with respect to a bottom surface of the tub 20. In this case, the laundry inlet 12 may be defined in the top surface 11 of the cabinet 10, the tub opening 22 may be defined in the top surface of the tub 20, and the drum opening may be defined in the top surface of the drum 30.

In one example, when the drum 30 rotates in a state in which the laundry is concentrated in a certain region inside the drum 30, a dynamic unbalance state (an unbalanced state) occurs in the drum 30. When the drum 30 in the unbalanced state rotates, the drum 30 rotates while vibrating by a centrifugal force acting on the laundry. The vibration of the drum 30 may be transmitted to the tub 20 or the cabinet 10 to cause a noise.

To avoid problems like this, the present disclosure may further include a balancer 39 that controls the unbalance of the drum 30 by generating a force to offset or damp the centrifugal force acting on the laundry.

In one example, referring to FIG. 1, the tub 20 may have a space defined therein in which the water may be stored, and the drum 30 may be rotatably disposed inside the tub 20. The drum 30 may include the open surface 31 through which the laundry enters and exits, and a bottom surface 33 positioned on an opposite side of the open surface 31.

FIG. 1 shows that the top surface of the drum 30 corresponds to the open surface 31, and the bottom surface thereof corresponds to the bottom surface 33 according to an embodiment of the present disclosure. As described above, the open surface 31 may correspond to a surface through which the laundry input through the laundry inlet 12 of the cabinet 10 and the tub opening 22 of the tub 20 passes.

In one example, the water supply 60 may be constructed to be connected to the means such as the detergent feeder, the water sprayer, or the like to supply the water into the tub 20 as described above. In one example, an embodiment of the present disclosure may include a controller 70 that controls the water supply 60 to adjust a water supply amount in a washing process and the like.

The controller 70 is configured to adjust the amount of water supplied to the tub 20 in the washing process, a rinsing process, or the like. The amount of water supplied may be adjusted through a manipulation unit disposed on the cabinet 10 and manipulated by a user, or may be determined through an amount of laundry, a load of the driver 50, or the like.

A plurality of water supply amounts are preset in the controller 70, and the controller 70 may be configured to control the water supply 60 based on one of the preset water supply amounts in response to a command selected by a user or the like in the washing process or the like.

In one example, as shown in FIG. 1, an embodiment of the present disclosure may further include a rotator 100. The rotator 100 may be rotatably installed on the bottom surface 33 and inside the drum 30.

In one embodiment of the present disclosure, the drum 30 and the rotator 100 may be constructed to be rotatable, independently. A water flow may be formed by the rotation of the drum 30 and the rotator 100, and friction or collision with the laundry may occur, so that washing or rinsing of the laundry may be made.

Figure 2:
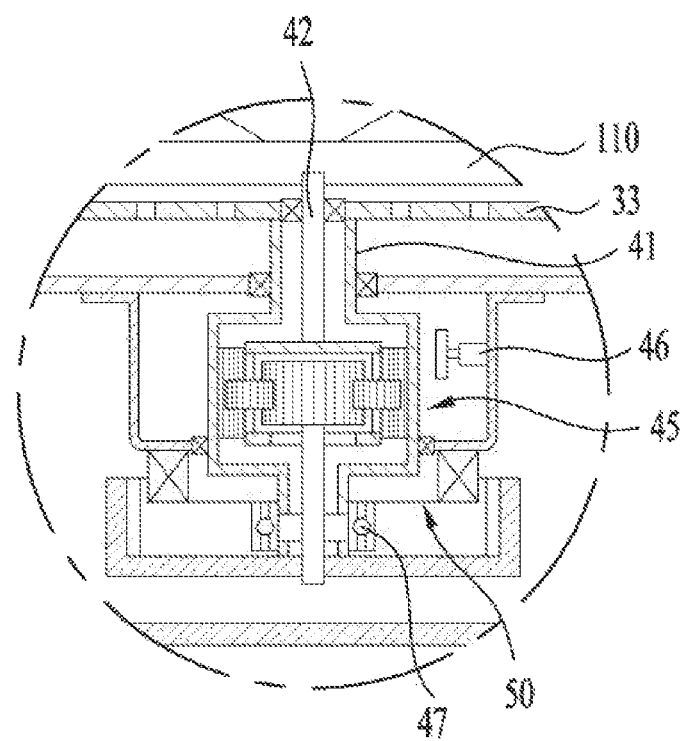
FIG. 2 is a view showing a rotation shaft coupled to a drum and a rotator in a laundry treating apparatus according to an embodiment of the present disclosure.

In one example, FIG. 2 shows the rotation shaft 40 coupled with the drum 30 and the rotator 100 according to an embodiment of the present disclosure.

Each of the drum 30 and the rotator 100 may be connected to the driver 50 through the rotation shaft 40 to receive a rotational force. In one embodiment of the present disclosure, the drum 30 may be rotated as a first rotation shaft 41 is coupled to the bottom surface 33 thereof, and the rotator 100 may be rotated by being coupled to a second rotation shaft 42 that passes through the bottom surface 33 and separately rotated with respect to the first rotation shaft 41.

The second rotation shaft 42 may rotate in a direction the same as or opposite to a rotation direction of the first rotation shaft 41. The first rotation shaft 41 and the second rotation shaft 42 may receive power through one driver 50, and the driver 50 may be connected to a gear set 45 that distributes the power to the first rotation shaft 41 and the second rotation shaft 42 and adjusts the rotation direction.

That is, a driving shaft of the driver 50 may be connected to the gear set 45 to transmit the power to the gear set 45, and each of the first rotation shaft 41 and the second rotation shaft 42 may be connected to the gear set 45 to receive the power.

The first rotation shaft 41 may be constructed as a hollow shaft, and the second rotation shaft 42 may be constructed as a solid shaft disposed inside the first rotation shaft 41. Accordingly, one embodiment of the present disclosure may effectively provide the power to the first rotation shaft 41 and the second rotation shaft 42 parallel to each other through the single driver 50.

FIG. 2 shows a planetary gear-type gear set 45, and shows a state in which each of the driving shaft, the first rotation shaft 41, and the second rotation shaft 42 is coupled to the gear set 45. Referring to FIG. 2, a rotational relationship of the first rotation shaft 41 and the second rotation shaft 42 in one embodiment of the present disclosure will be described as follows.

The driving shaft of the driver 50 may be connected to a central sun gear in the planetary gear-type gear set 45. When the driving shaft is rotated, a satellite gear and a ring gear in the gear set 45 may rotate together by the rotation of the sun gear.

The first rotation shaft 41 coupled to the bottom surface 33 of the drum 30 may be connected to the ring gear positioned at the outermost portion of the gear set 45. The second rotation shaft 42 coupled to the rotator 100 may be connected to the satellite gear disposed between the sun gear and the ring gear in the gear set 45.

In one example, the gear set 45 may include a first clutch element 46 and a second clutch element 47 that may restrict the rotation of each of the rotation shafts 40 as needed. The gear set 45 may further include a gear housing fixed to the tub 20, and the first clutch element 46 may be disposed in the gear housing to selectively restrict the rotation of the first rotation shaft 41 connected to the ring gear.

The second clutch element 47 may be constructed to mutually restrict or release the rotations of the driving shaft and the ring gear. That is, the rotation of the ring gear or the rotation of the first rotation shaft 41 may be synchronized with or desynchronized with the driving shaft by the second clutch element 47.

In one embodiment of the present disclosure, when the first clutch element 46 and the second clutch element 47 are in the releasing state, the first rotation shaft 41 and the second rotation shaft 42 rotate in the opposite directions based on the rotational relationship of the planetary gear. That is, the drum 30 and the rotator 100 rotate in the opposite directions.

In one example, when the first clutch element 46 is in the restricting state, the rotations of the ring gear and the first rotation shaft 41 are restricted, and the rotation of the second rotation shaft 42 is performed. That is, the drum 30 is in a stationary state and only the rotator 100 rotates. In this connection, the rotation direction of the rotator 100 may be determined based on the rotation direction of the driver 50.

In one example, when the second clutch element 47 is in the restricting state, the rotations of the driving shaft and the first rotation shaft 41 are mutually restricted to each other, and the rotations of the driving shaft, the first rotation shaft 41, and the second rotation shaft 42 may be mutually restricted to each other by the rotational relationship of the planetary gear. That is, the drum 30 and the rotator 100 rotate in the same direction.

When the first clutch element 46 and the second clutch element 47 are in the restricting state at the same time, the driving shaft, the first rotation shaft 41, and the second rotation shaft 42 are all in the stationary state. The controller 70 may implement a necessary driving state by appropriately controlling the driver 50, the first clutch element 46, the second clutch element 47, and the like in the washing process, the rinsing process, and the like.

Figure 3:
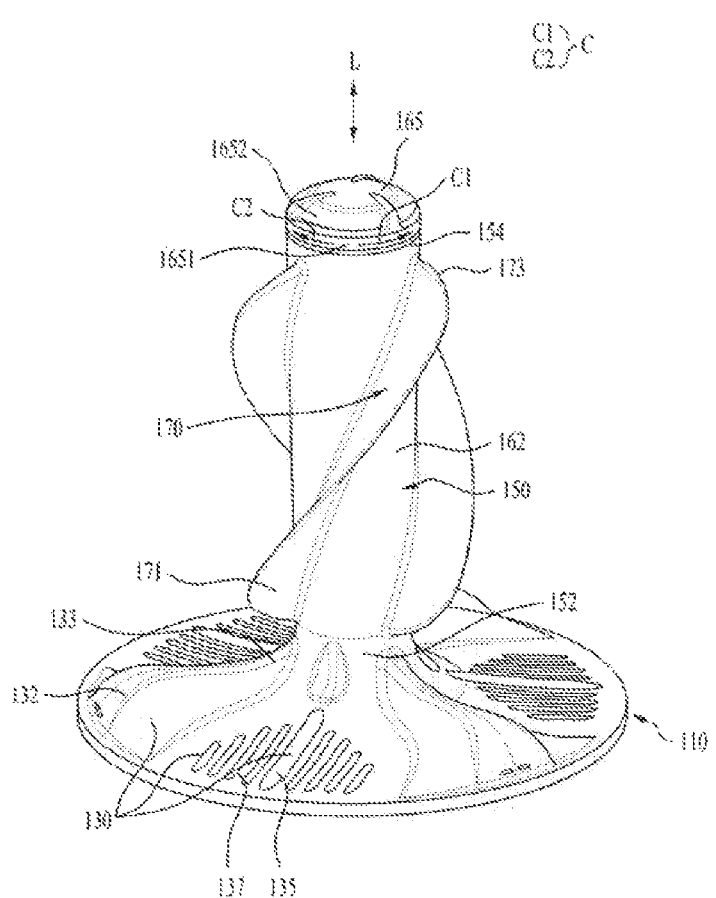
FIG. 3 is a perspective view illustrating a rotator of a laundry treating apparatus according to an embodiment of the present disclosure.

In one example, FIG. 3 is a perspective view of the rotator 100 according to an embodiment of the present disclosure. In one embodiment of the present disclosure, the rotator 100 may include a bottom portion 110, a pillar 150, and a blade 170.

The bottom portion 110 may be located on the bottom surface 33 of the drum 30. The bottom portion 110 may be positioned parallel to the bottom surface 33 of the drum 30 to be rotatable on the bottom surface 33. The second rotation shaft 42 described above may be coupled to the bottom portion 110.

That is, the first rotation shaft 41 may be coupled to the drum 30, and the second rotation shaft 42 constructed as the solid shaft inside the hollow first rotation shaft 41 may penetrate the bottom surface 33 of the drum 30 and be coupled to the bottom portion 110 of the rotator 100.

The rotator 100 coupled to the second rotation shaft 42 may rotate independently with respect to the drum 30. That is, the rotator 100 may be rotated in the direction the same as or opposite to that of the drum 30, and such rotation direction may be selected by the controller 70 or the like when necessary.

The first rotation shaft 41 may be coupled to a center of the bottom surface 33 of the drum 30. FIG. 1 shows that the top surface of the drum 30 is opened to define the open surface 31 according to an embodiment of the present disclosure, and the bottom surface thereof corresponds to the bottom surface 33.

That is, the laundry treating apparatus 1 shown in FIG. 1 corresponds to a top loader. The drum 30 may have a side surface, that is, an outer circumferential surface, that connects the top surface with the bottom surface, and a cross-section of the drum 30 may have a circular shape for balancing the rotation. That is, the drum 30 may have a cylindrical shape.

The second rotation shaft 42 may be coupled to a center of the bottom portion 110 of the rotator 100. The second rotation shaft 42 may be coupled to one surface facing the drum 30, that is, a bottom surface of the bottom portion 110, or the second rotation shaft 42 may pass through a center of the drum 30 to be coupled to the bottom portion 110.

The bottom portion 110 may have a circular cross-section in consideration of balancing of the rotation. The bottom portion 110 may be rotated about the second rotation shaft 42 coupled to the center thereof, and the center of the bottom portion 110 may coincide with the center of the drum 30.

The bottom portion 110 may basically have a disk shape, and a specific shape thereof may be determined in consideration of a connection relationship between a protrusion portion 130, the pillar 150, and the like as will be described later.

The bottom portion 110 may cover at least a portion of the drum 30. The bottom portion 110 may be constructed such that the bottom surface thereof and the drum 30 are spaced apart from each other to facilitate the rotation. However, a spaced distance between the bottom portion 110 and the bottom surface 33 of the drum 30 may be varied as needed.

In one example, as shown in FIG. 3, the pillar 150 may have a shape protruding from the bottom portion 110 toward the open surface 31. The pillar 150 may be integrally formed with the bottom portion 110 or manufactured separately and coupled to the bottom portion 110.

The pillar 150 may be rotated together with the bottom portion 110. The pillar 150 may extend from the center of the bottom portion 110 toward the open surface 31. FIG. 1 shows the pillar 150 protruding upwardly from the bottom portion 110 according to an embodiment of the present disclosure. The pillar 150 may have a circular cross-section, and a protruding height from the bottom portion 110 may vary.

The pillar 150 may have a curved side surface forming an outer circumferential surface 162, the rotator 100 may include the blade 170, and the blade 170 may de disposed on the outer circumferential surface 162 of the pillar 150.

The blade 170 may be constructed to protrude from the pillar 150, and may extend along the pillar 150 to form the water flow inside the drum 30 when the pillar 150 rotates.

A plurality of blades 170 may be disposed and spaced apart from each other along a circumferential direction C of the pillar 150, and may extend from the bottom portion 110 to the open surface 31 along a direction inclined with respect to a longitudinal direction L of the pillar 150.

Specifically, as shown in FIG. 3, the blade 170 may extend approximately along the longitudinal direction L of the pillar 150. The plurality of blades 170 may be disposed, and the number of blades may vary as needed. FIG. 3 shows a state in which three blades 170 are disposed on the outer circumferential surface 162 of the pillar 150 according to an embodiment of the present disclosure.

The blades 170 may be uniformly disposed along the circumferential direction C of the pillar 150. That is, spaced distances between the blades 170 may be the same. When viewed from the open surface 31 of the drum 30, the blades 170 may be spaced apart from each other at an angle of 120 degrees with respect to a center of the pillar 150.

The blade 170 may extend along a direction inclined with respect to the longitudinal direction L or the circumferential direction C of the pillar 150. The blade 170 may extend obliquely from the bottom portion 110 to the open surface 31 on the outer circumferential surface 162 of the pillar 150. An extended length of the blade 170 may be varied as needed.

As the blade 170 extends obliquely, when the rotator 100 is rotated, an ascending or descending water flow may be formed in the water inside the drum 30 by the blade 170 of the pillar 150.

For example, when the blade 170 extends from the bottom portion 110 toward the open surface 31 while being inclined with respect to one direction C1 among the circumferential directions C of the pillar 150, the descending water flow may be formed by the inclined shape of the blade 170 when the rotator 100 rotates in said one direction C1, and the ascending water flow may be formed by the blade 170 when the rotator 100 is rotated in the other direction C2.

In one embodiment of the present disclosure, said one direction C1 and the other direction C2 of the circumferential direction C of the pillar 150 may correspond to directions opposite to each other with respect to the outer circumferential surface 162 of the pillar 150, and may be a direction perpendicular to the longitudinal direction L of the pillar 150.

Said one direction C1 and the other direction C2 of the circumferential direction C of the pillar 150 may correspond to the rotation direction of the rotator 100. Because the rotation direction of the rotator 100 and the circumferential direction C of the pillar 150 are parallel to each other, the rotator 100 may be rotated in said one direction C1 or rotated in the other direction C2.

In one embodiment of the present disclosure, as the plurality of blades 170 are disposed and spaced apart from each other, the water flow may be uniformly formed by the pillar. When the rotator 100 is rotated by the inclined extension form of the blade 170, not a simple rotational water flow, but the ascending water flow in which water at a lower portion of the drum 30 flows upward or the descending water flow in which water at an upper portion of the drum 30 flows downward may occur.

One embodiment of the present disclosure may form a three-dimensional water flow through the rotator 100, and thus greatly improve a washing efficiency for the laundry in the washing process. In addition, various washing schemes may be implemented by appropriately utilizing the ascending water flow and the descending water flow.

The blade 170 according to an embodiment of the present disclosure may have a screw shape. That is, the plurality of blades 170 may be disposed and be spaced apart from each other along the circumferential direction C of the pillar 150, and may extend in the form of the screw from one end 171 facing the bottom portion 110 to the other end 173 facing the open surface 31.

In other words, in one embodiment of the present disclosure, the plurality of blades 170 may extend while being wound on the outer circumferential surface 162 from said one end 152 facing the bottom portion 110 to the other end 154 facing the open surface 31.

In one example, when referring to FIG. 3, in one embodiment of the present disclosure, the blade 170 may be inclined in said one direction C1 among the circumferential directions C of the pillar 150 with respect to the longitudinal direction L of the pillar 150, and may extend from said one end 171 to the other end 173.

That is, the blade 170 may be constructed to be inclined in only said one direction C1 and not to be inclined in the other direction C2. When the inclination direction of the blade 170 is changed to the other direction C2 during the extension, during the rotation of the rotator 100, a portion of the blade 170 may generate the ascending water flow and the remaining portion may generate the descending water flow.

In this case, the ascending water flow and the descending water flow may occur simultaneously in the rotation of the rotator 100 in said one direction C1, so that it may be difficult to maximize the effect of either ascending or descending of the water.

Accordingly, in one embodiment of the present disclosure, the blade 170 extends obliquely with respect to the longitudinal direction L of the pillar 150, and extends obliquely to said one direction C1 among the circumferential directions C of the pillar 150, so that water flow characteristics for the rotation of the rotator 100 in said one direction C1 and the other direction C2 may be maximized. Said one direction C1 may be one of a clockwise direction and a counterclockwise direction, and the other direction C2 may be the other one.

In one example, in one embodiment of the present disclosure as shown in FIG. 3, the blade 170 may continuously extend from said one end 171 to the other end 173. That is, the blade 170 may be continuously extended without being cut between said one end 171 and the other end 173.

In addition, the blade 170 may extend from said one end 171 to the other end 173 to be continuously inclined with respect to the longitudinal direction L of the pillar 150. That is, the blade 170 may be formed in an inclined shape as a whole without a portion parallel to the longitudinal direction L of the pillar 150.

When at least a portion of the blade 170 is parallel to the longitudinal direction L or the circumferential direction C of the pillar 150, it may be disadvantageous to forming the ascending water flow or the descending water flow resulted from the rotation of the pillar 150. Accordingly, in one embodiment of the present disclosure, the blade 170 is inclined with respect to the longitudinal direction L of the pillar 150 over an entire length.

Figure 4A:
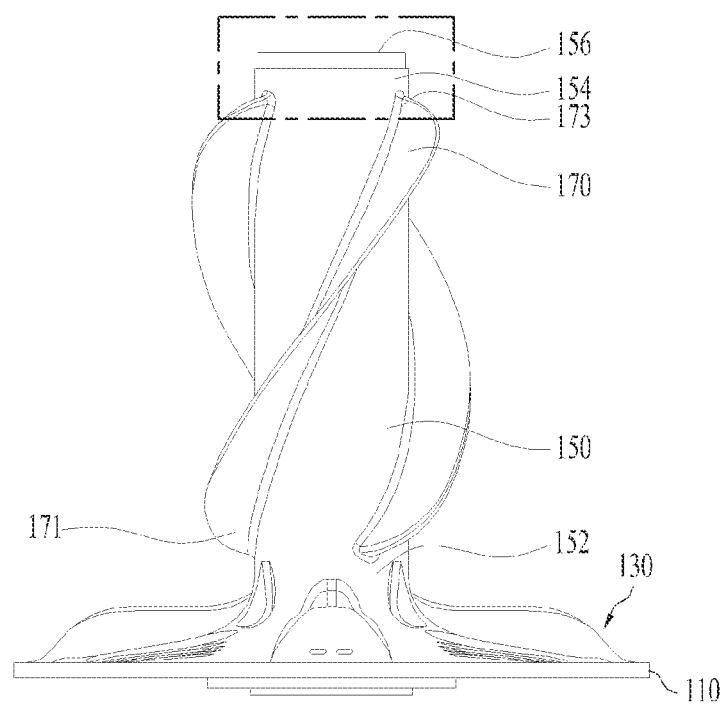
FIGS. 4A to 4C are views showing a blade disposed in a rotator of a laundry treating apparatus according to an embodiment of the present disclosure.
Figure 4B:
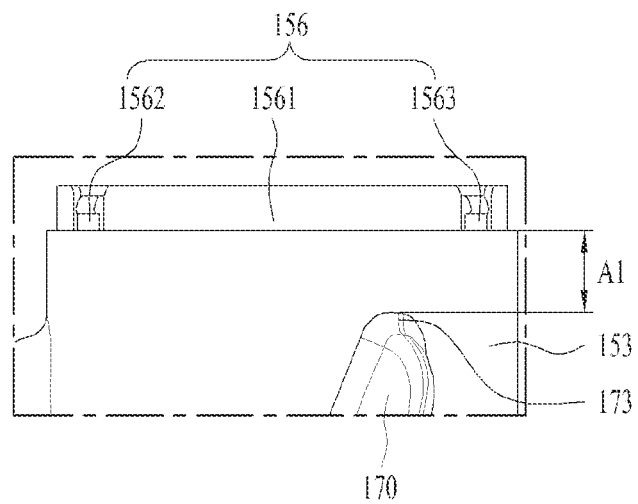
Figure 4C:
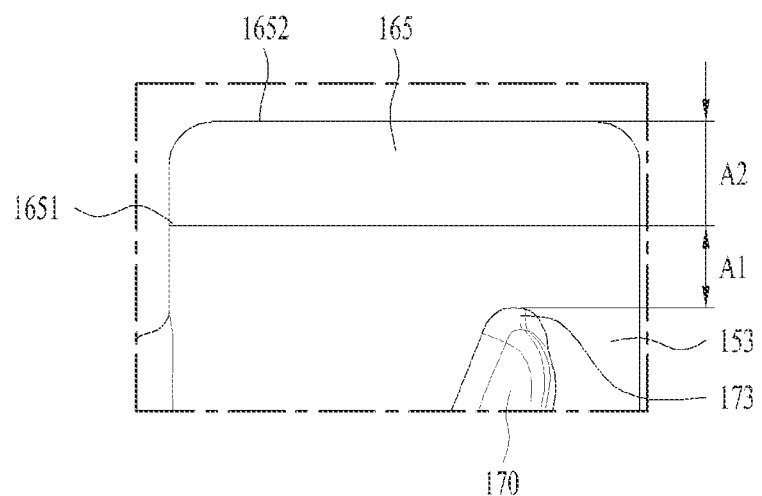

FIG. 4A to 4C are views showing a blade disposed in a rotator of a laundry treating apparatus according to an embodiment of the present disclosure. Specifically, FIG. 4A shows that a cap 165 is separated from the pillar 150, FIG. 4B shows that the other end 173 of the blade 170 is spaced apart from a cap-coupled-portion 156, and FIG. 4C shows that the cap 165 is coupled to the pillar 150, so that the other end 173 of the blade 170 is spaced apart from the cap 165.

Referring to FIG. 4A, the laundry treating apparatus 1 according to an embodiment of the present disclosure may include the rotator 100 rotatably disposed on the bottom surface 33 inside the drum 30.

The rotator 100 may include the bottom portion 110 located on the bottom surface 33. That is, the bottom portion 110 may be constructed to cover a portion or an entirety of the bottom surface 33. When the bottom portion 110 is constructed to cover the portion of the bottom surface 33, the bottom portion 110 may be disposed at a center of the bottom surface 33. Accordingly, the laundry may be washed in a balanced way.

The bottom portion 110 may be formed in a disk shape. The bottom portion 110 may rotate together when the drum 30 is rotated or rotate independently of the drum 30 to generate the water flow. The shape of the bottom portion 110 may not be limited thereto, and may vary based on a shape of the drum 30, a size of the drum 30, the laundry accommodated in the drum 30, and a load applied to the drum 30.

The rotator 100 may include the pillar 150 protruding from the bottom portion 110 toward the open surface 31. The pillar 150 may be disposed at a center of the bottom portion 110. The bottom portion 110 may be disposed at the center of the bottom surface 33, and the pillar 150 may be disposed at the center of the bottom portion 110. When the laundry is stored in the drum 30, the laundry may be stored in a balanced manner without being biased toward one side of the drum 30. In addition, when the laundry washing is in progress, the laundry may be uniformly washed in the balanced manner without being biased toward one side of the drum 30.

The pillar 150 may be formed in various shapes. In the drawing, the pillar 150 is shown in a cylindrical shape. Accordingly, the pillar 150 may be advantageous to generate the water flow and agitate the laundry during the rotation. The pillar 150 may be formed in a hollow shape. That is, it is possible to reduce an amount of material used when manufacturing the pillar 150. Accordingly, it is possible to secure an economic feasibility when manufacturing the rotator 100. In addition, because a weight of the pillar 150 is reduced, a driving force for rotating the pillar 150 may be reduced. Accordingly, it is possible to reduce a cost when driving the laundry treating apparatus 1.

The rotator 100 may include the blade 170 protruding from the outer circumferential surface 162 of the pillar 150. The blade 170 may generate the water flow when the pillar 150 rotates. In addition, the blade 170 may agitate the laundry when the pillar 150 rotates.

The blade 170 may extend from said one end 171 thereof facing toward the bottom surface 33 to the other end 173 thereof facing toward the open surface. The plurality of blades 170 may be disposed to be spaced apart from each other along the circumferential direction of the pillar 150. In addition, the pillar 150 may extend from said one end 171 to the other end 173 to be inclined to one side with respect to the longitudinal direction L of the pillar 150.

In other words, the blade 170 may be formed in a spiral shape. That is, the blade 170 may be formed in a form of a screw. The blade 170 may rotate along an outer circumference of the pillar 150 by one-third of the outer circumference of the pillar 150.

In the drawing, it is shown that three blades 170 are disposed as each blade 170 rotates along the outer circumference of the pillar 150 by one-third of the outer circumference of the pillar 150. The number of blades 170 may vary depending on a degree of rotation along the outer circumference of the pillar 150.

The blade 170 may extend to be inclined to one side with respect to the radial direction of the pillar 150 from the one end 171 to a midpoint of the blade 170. That is, the blade 170 may extend to be inclined toward the open surface 31 with respect to the radial direction of the pillar 150 from the one end 171 to the midpoint of the blade 170.

The midpoint of the blade 170 may be a midpoint with respect to a length of the blade 170 in the longitudinal direction of the pillar. The blade 170 may extend to be inclined to the other side with respect to the radial direction of the pillar 150 from the midpoint of the blade 170 to the other end 173. That is, the blade 170 may extend to be inclined toward the bottom surface 33 with respect to the radial direction of the pillar 150 from the midpoint of the blade 170 to the other end 173.

In other words, the inclinations of the blade 170 in the radial direction of the pillar 150 may be opposite about the midpoint of the blade 170. Accordingly, various water flows may be generated for both clockwise and counterclockwise rotations of the drum 30. In addition, an agitation efficiency of the laundry may be improved. That is, the washing efficiency may be improved.

Referring to FIG. 4C, the rotator 100 may include the cap 165 coupled to the end of the pillar 150 to close the interior of the pillar 150. As described above, the pillar 150 may be formed in the hollow shape. An opening 158 may be defined at an end 160 of the pillar 150 facing toward the open surface 31 (see FIG. 5A).

That is, in the rotator 100, the pillar 150 may be formed in the hollow shape in order to save the material during the manufacturing. Furthermore, the cap 165 may close the opening 158 of the pillar 150 such that water does not flow into the pillar 150 during the washing. Accordingly, it is possible to reduce the cost in the manufacturing of the rotator 100, and may reduce the driving load during the driving as the weight of the rotator 100 is reduced.

The blade 170 may be disposed such that the other end 173 thereof is spaced apart from the cap 165. That is, portions of the rotator 100 except for the cap 165 may be manufactured, and then, the cap 165 may be coupled to the pillar 150 to complete the rotator 100.

Thus, the cap 165 may be easily coupled to the pillar 150. When the other end 173 of the blade 170 is not spaced apart from the cap 165, The blade 170 may be more likely to be exposed to an external impact during the coupling process with the cap 165. That is, a possibility of damage to the other end 173 of the blade 170 may be increased.

Accordingly, when the portions of the rotator 100 except for the cap 165 are manufactured and then coupled with the cap 165, the other end 173 of the blade 170 is disposed to be spaced apart from the cap 165, so that the damage thereof may be prevented as much as possible. In addition, the cap 165 may be easily coupled to the pillar 150 because the possibility of damage is reduced.

The rotator 100 may be manufactured by injection molding. When the rotator 100 is manufactured by the injection molding, deformation may occur in a cooling process. In particular, the greatest deformation may occur at the end of the pillar 150. When the pillar 150 has the same thickness as the blade 170, the deformation in the cooling process may be prevented as much as possible. However, when the pillar 150 has a thickness different from that of the blade 170, the deformation thereof increases.

When the deformation occurs at the end of the pillar 150, coupling with the cap 165 may not be easy. Accordingly, the other end 173 may be disposed to be spaced apart from the end of the pillar 150. That is, the other end 173 may be disposed to be spaced apart from a contact surface of the cap 165 and the pillar 150. Accordingly, when the pillar 150 is manufactured by the injection molding, the deformation thereof may be prevented as much as possible during the cooling. Furthermore, the cap 165 may be easily coupled to the pillar 150, and a coupling force therebetween may be increased. A detailed description thereof will be provided later.

Referring to FIG. 4A, 4B, 4C, the pillar 150 may include a pillar main body 153 protruding from the center of the bottom portion 110 and formed in a hollow shape, and having the blade 170 disposed on an outer circumferential surface thereof.

The pillar main body 153 may form an external shape of the pillar 150. The pillar main body 153 may be formed in a cylindrical shape. In addition, a diameter of the pillar main body 153 may vary toward the open surface 31.

That is, a portion of the pillar main body 153 connected to the bottom portion 110 may have the largest diameter. The diameter of the rotator 100 may be prevented from rapidly varying from the bottom surface 33 toward the open surface 31. Accordingly, the rotator 100 may have a structural rigidity in the manufacturing. In addition, the rotator 100 may be prevented from being damaged during the washing as much as possible.

In addition, the diameter of the pillar main body 153 may be uniformly reduced in a direction toward the open surface 31. Accordingly, the rotator 100 may reduce the amount of material required for the manufacturing. In addition, it is possible to reduce the weight of the rotator 100.

In addition, the pillar main body 153 may be constructed such that the diameter thereof is reduced in the direction toward the open surface 31 and then is constant from a specific portion. Accordingly, the pillar main body 153 may have a structural rigidity of a value equal to or greater than a predetermined value.

That is, the diameter of the pillar main body 153 may be determined in consideration of the size of the blade 170, the size of the drum 30, a capacity of the laundry treating apparatus 1, a height of the pillar main body 153 in the direction toward the open surface 31, and the like. In other words, the diameter of the pillar main body 153 may be determined in consideration of a manufacturing efficiency, a rigidity against the damage during the washing, and the like.

A portion of the pillar main body 153 extending from the bottom portion 110 may be thicker than a portion of the pillar main body 153 facing toward the open surface 31. Accordingly, when the rotator 100 is manufactured, the pillar main body 153 may have a structural rigidity at a portion thereof in contact with the bottom portion 110.

In addition, the pillar main body 153 is constructed such that a portion thereof where the damage may occur easily has a large thickness, and a portion thereof where the damage may occur less easily has a small thickness, thereby saving the material during the manufacturing.

The pillar 150 may include a cap-coupled-portion 156 that extends from the pillar main body 153 toward the open surface 31 and is coupled to the cap 165. The cap-coupled-portion 156 may facilitate the coupling between the cap 165 and the pillar 150.

The cap-coupled-portion 156 may be formed in a hollow shape. In addition, an outer diameter of the cap-coupled-portion 156 may be smaller than an outer diameter of the pillar main body 153. That is, when the cap-coupled-portion 156 is manufactured integrally with the pillar main body 153, the amount of material used may be reduced. In addition, the weight of the rotator 100 may be reduced.

An inner circumferential surface of the cap-coupled-portion 156 may form a continuous one surface with an inner circumferential surface of the pillar main body 153. That is, the cap-coupled-portion 156 may be constructed by cutting a portion from the end of the pillar 150 in a central direction of the pillar 150. Accordingly, a mold for manufacturing the rotator 100 may be easily manufactured.

The cap-coupled-portion 156 may include a plurality of cap-coupled-main bodies 1561. The cap-coupled-main bodies 1561 may be spaced apart from each other along a circumference of the pillar main body 153. The drawing shows that four cap-coupled-main bodies 1561 are disposed to be spaced apart from each other at regular spacings along the circumference of the pillar main body 153. However, the present disclosure may not be limited thereto, and the number of the cap-coupled-main bodies 1561 may be determined in consideration of a thickness of the pillar main body 153, a length of the cap-coupled-main body 1561 in the longitudinal direction L of the pillar 150, a thickness of the cap-coupled-main body 1561, and the like.

Shapes of the cap-coupled-main bodies 1561 may correspond to each other. The cap-coupled-portion 156 may include a hook coupling portion 1562 disposed between a pair of cap-coupled-main bodies 1561. When the four cap-coupled-main bodies 1561 are disposed, three hook coupling portions 1562 may be disposed. In addition, all of the hook coupling portions 1562 may be disposed between the cap-coupled-main bodies 1561, and may be disposed only between specific cap-coupled-main bodies 1561. That is, the number of the hook coupling portions 1562 may be determined in consideration of a thickness of the cap 165, a thickness of the hook coupling portion 1562, a driving load, and the like.

A length of the cap-coupled-main body 1561 in the circumferential direction of the pillar main body 153 may be greater than a length in the circumferential direction of the hook coupling portion 1562. In addition, the hook coupling portion 1562 may be spaced apart from a pair of cap-coupled-main bodies 1561 on both sides of the hook coupling portion 1562 by a predetermined spacing in the circumferential direction of the pillar main body 153.

One side of the hook coupling portion 1562 facing toward the open surface may be constructed as a free end. Conversely, the other side of the hook coupling portion 1562 facing toward the bottom surface 33 may be constructed as a fixed end. The hook coupling portion 1562 may move in the central direction or the radial direction of the cap-coupled-main body 1561. Accordingly, the cap 165 may be easily coupled to the pillar 150.

The spaced distance between the hook coupling portion 1562 and the cap-coupled-main body 1561 may be smaller than a length in the circumferential direction of the hook coupling portion 1562. The cap-coupled-main body 1561 together with the hook coupling portion 1562 may have cross-sections with shapes corresponding to a shape of a cross-section of the inner circumferential surface of the cap 165. Accordingly, the cap 165 may be easily coupled to the cap-coupled-main body 1561 and the hook coupling portion 1562. In addition, the cap 165 may have an increased contact area with the cap-coupled-main body 1561 and the hook coupling portion 1562, so that a coupling force and a support force therebetween may be improved.

In addition, the cap-coupled-portion 156 may include a hook protrusion 1563 protruding from the hook coupling portion 1562 in a radial direction of the cap-coupled-main body 1561. In addition, the hook protrusion 1563 may be formed to be convex from the open surface 31 toward the bottom surface 33. Accordingly, the hook protrusion 1563 may easily couple the cap 165 to the pillar 150. In addition, the hook protrusion 1563 may prevent the cap 165 from deviating from the pillar 150 as much as possible.

The other end 173 may be constructed to be spaced apart from a contact surface between the pillar main body 153 and the cap-coupled-portion 156 in the longitudinal direction L of the pillar 150. That is, the other end 173 of the blade 170 may be spaced apart from the contact surface between the pillar main body 153 and the cap-coupled-portion 156 by a predetermined distance A1. That is, when the cap 165 is coupled to the pillar 150, the cap 165 may be in contact with one end of the pillar main body 153 facing toward the open surface 31.

The spaced distance between the other end 173 of the blade 170 and the cap 165 may be set based on the contact surface between the pillar main body 153 and the cap-coupled-portion 156. The pillar main body 153 may be formed in the hollow shape and may be manufactured integrally with the cap-coupled-portion 156. Thereafter, the cap 165 may be coupled to the cap-coupled-portion 156. That is, the manufacturing of the portions the rotator 100 except for the cap 165 may be based on the contact surface between the pillar main body 153 and the cap-coupled-portion 156. Accordingly, when the rotator 100 is manufactured, a criterion of a position at which the other end 173 of the blade 170 is disposed may be easily set.

The cap 165 may include a cap fitting portion 1651 coupled to the cap-coupled-portion 156. The cap 165 may include a cap closing portion 1652 extending from the cap fitting portion 1651 to close the interior of the pillar main body 153. In addition, the cap fitting portion 1651 may be coupled to the cap-coupled-portion 156 such that the cap fitting portion 1651 is spaced apart from the other end 173 and the pillar 150 by a predetermined distance A1 in the longitudinal direction L. That is, an inner circumferential surface of the cap fitting portion 1651 may be coupled to and in contact with the cap-coupled-portion 156. In addition, an end of the cap fitting portion 1651 facing the bottom surface 33 may be in contact with and coupled to the end of the pillar main body 153. Accordingly, it is possible to prevent the water from flowing into the pillar 150 during the washing. In addition, a contact area of the cap 165 with the pillar main body 153 is secured as much as possible to receive strong coupling force and supporting force.

The cap fitting portion 1651 may have a hook protrusion groove (not shown) defined in an inner surface thereof to be coupled with the hook protrusion 1563. The hook protrusion groove may maximally prevent the cap 165 from deviating from the pillar main body 153 together with the hook protrusion 1563.

An outer circumferential surface of the cap 165 may form a continuous one surface with an outer circumferential surface of the pillar main body 153. That is, an outer circumferential surface of the cap fitting portion 1651 may form a continuous one surface with the outer circumferential surface of the pillar main body 153. Accordingly, the cap 165 does not have a portion protruding in a radial direction of the cap-coupled-portion 156, so that the laundry may be prevented from being caught on the cap 165. In addition, damage resulted from the external impact may be prevented as much as possible.

A cross-section of the cap closing portion 1652 may be in a shape corresponding to that of a cross-section of the end of the pillar main body 153. That is, the cross-section of the cap closing portion 1652 may be in a circular shape when the cross-section of the end of the pillar main body 153 is formed in a circular shape. In addition, the outer circumferential surface of the cap closing portion 1652 may be rounded. Accordingly, damage to the laundry caused as the laundry is caught on the cap closing portion 1652 may be prevented as much as possible.

The blade 170 may be constructed such that the other end 173 thereof is spaced apart from the cap fitting portion 1651 by the predetermined distance A1 in the longitudinal direction L of the pillar 150. The predetermined distance A1 may be a spaced distance between an end of the cap fitting portion 1651 facing the bottom surface and the other end 173.

In addition, when the cap fitting portion 1651 is in contact with and is coupled to the pillar main body 153, the predetermined distance A1 may be a spaced distance from the contact surface between the pillar main body 153 and the cap-coupled-portion 156 to the other end 173. Accordingly, when the cap 165 is coupled to the pillar 150, damage to the blade 170 caused by the cap-coupled-portion 156 may be prevented as much as possible. In addition, damage to the cap 165 by the blade 170 may be prevented as much as possible.

In one example, in one embodiment of the present disclosure, a height of the rotator 100 may be determined by adding a length A2 of the cap 165 in the longitudinal direction L of the pillar 150 and a length of the pillar 150 in the longitudinal direction L. That is, the height of the rotator 100 may increase as the length of the pillar 150 in the longitudinal direction L increases.

Accordingly, when the length A2 of the cap 165 in the longitudinal direction L of the pillar 150 increases, a dead space of the rotator 100 in which the blade 170 is not disposed may increase. To prevent this, the length A2 of the cap 165 in the longitudinal direction L of the pillar 150 may be determined to be small. As a result, the dead space of the rotator 100 in which the blade 170 is not disposed is reduced, so that a space utilization efficiency may be improved.

Further, the blade 170 is positioned with the other end 173 spaced apart from the cap 165. The predetermined distance A1 between the other end 173 and the cap 165 may be smaller than the length A2 of the cap 165 in the longitudinal direction L of the pillar 150. That is, the predetermined distance A1 may be the same as a distance at which the other end 173 and the cap fitting portion 1651 are spaced apart from each other in the longitudinal direction L of the pillar 150. In other words, the predetermined distance A1 between the other end 173 and the cap fitting portion 1651 in the longitudinal direction L of the pillar 150 may be smaller than the length A2 of the cap 165.

As the predetermined distance A1 between the cap fitting portion 1651 and the other end 173 of the blade 170 increases, a region occupied by the blade 170 in the pillar 150 may be reduced, which may be disadvantageous in increasing a contact area between the blade 170 and water.

Accordingly, one embodiment of the present disclosure may limit the predetermined distance A1 between the cap fitting portion 1651 and the blade 170 to be smaller than the length A2 of the cap 165. The predetermined distance A1 between the cap fitting portion 1651 and the blade 170 and the length A2 of the cap 165 may be understood as a vertical distance in the longitudinal direction L of the pillar 150 as shown in FIG. 4C.

The predetermined distance A1 between the cap fitting portion 1651 and the blade 170 and the length A2 of the cap 165 may be determined specifically in consideration of various factors such as the length of the pillar 150, the utilization of the cap 165, the thickness or the inclination angle of the blade 170, and the like.

Figure 5A:
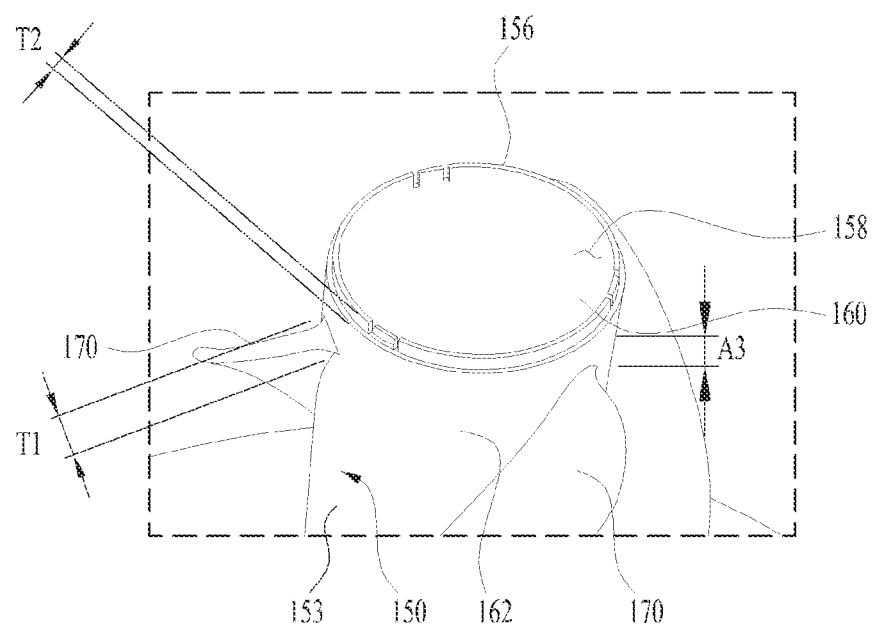
FIGS. 5A to 5D are views showing a degree of deformation of a pillar based on a degree of spacing between a blade and a cap-coupled-portion.
Figure 5B:
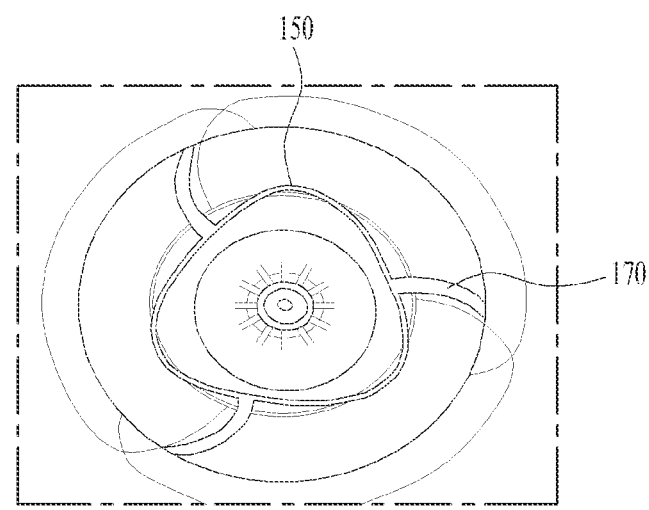
Figure 5C:
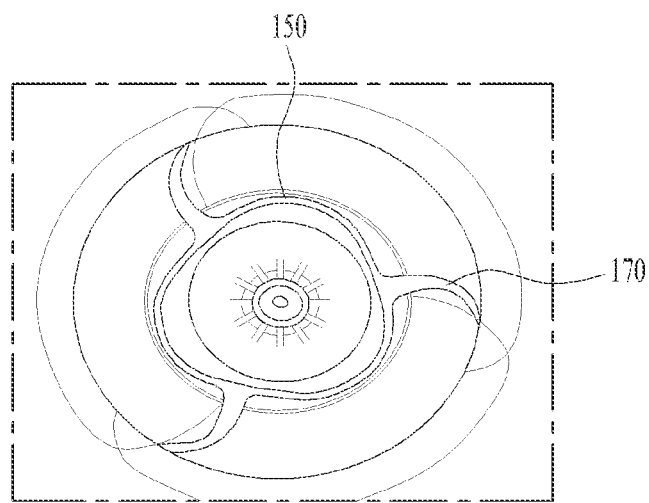
Figure 5D:
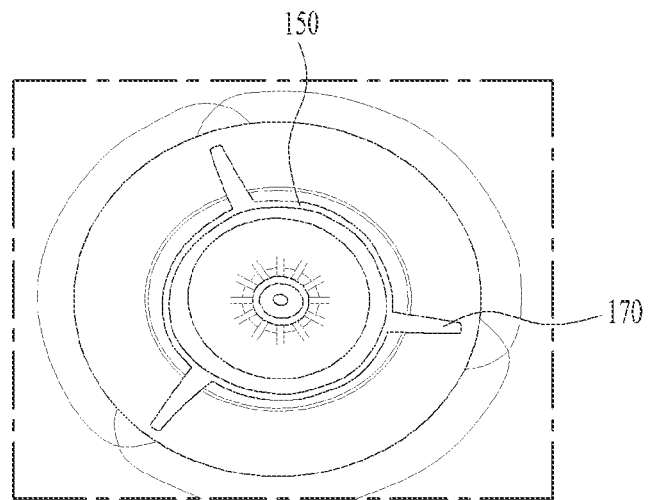

FIGS. 5A to 5D are views showing a degree of deformation of a pillar based on a degree of spacing between a blade and a cap-coupled-portion. Specifically, FIG. 5A shows the pillar 150 before cooling in the manufacture of the rotator 100, and FIG. 5B, 5C, 5D show deformation of the other end 173 of the blade 170 and the cap-coupled-portion 156 after cooling of the pillar 150 while increasing the spaced distance A3 between the other end 173 and the cap-coupled-portion 156.

Referring to FIG. 5A, 5B, 5C, the rotator 100 according to an embodiment of the present disclosure may be manufactured by various methods. The rotator 100 may be manufactured by injection molding as one of the manufacturing methods.

The blade 170 and the pillar 150 may be formed integrally. That is, when the rotator 100 is manufactured, the blade 170 and the pillar 150 may be integrally manufactured. Furthermore, the blade 170, the pillar 150, and the bottom portion 110 may be formed integrally. That is, when the rotator 100 is manufactured, the blade 170, the pillar 150, and the bottom portion 110 may be integrally manufactured.

However, as described above, in order to save the material in the manufacture of the rotator 100, the pillar 150 may be formed in the hollow shape. That is, the opening 158 is defined at the end of the pillar 150, so that the interior of the pillar 150 may communicate with the exterior of the pillar 150. In this case, in the rotator 100, the cap 165 may be coupled to the pillar 150 to prevent water from flowing into the pillar 150.

In addition, the blade 170 may have a thickness different from that of the pillar 150. The thickness of the blade 170 may be determined to form the three-dimensional water flow and reduce water resistance in forming the water flow. In addition, the pillar 150 may be determined to have a thickness for maintaining structural rigidity while reducing the amount of material used. As a result, the water flow may be efficiently generated in the rotator 100 and the economic feasibility may be secured in the manufacturing.

The pillar 150 and the blade 170 except for the cap 165 of the rotator 100 may be integrally manufactured by the injection molding. When the rotator 100 is manufactured by the injection molding, the rotator 100 may be subjected to the cooling process. In the cooling process, the rotator 100 may be deformed.

The blade 170 may be constructed to increase in thickness toward the center of the pillar 150. That is, a portion of the blade 170 in contact with the pillar 150 may have the largest thickness. Accordingly, a connection portion that may be easily damaged by an external impact may have structural rigidity. In addition, when the rotator 100 is rotated, the blade 170 may form the three-dimensional water flow.

The pillar 150 is formed in the hollow shape, so that the greatest deformation may occur at the end of the pillar 150. That is, the greatest deformation may occur at an end of the pillar main body 153 and the cap-coupled-portion 156. When the pillar main body 153 has the same thickness as the blade 170, the deformation during the cooling may be prevented as much as possible. However, when the thickness of the pillar main body 153 and the blade 170 are different, the deformation at the end of the pillar main body 153 and the cap-coupled-portion 156 may increase.

When the deformation occurs at the end of the pillar main body 153 and the cap-coupled-portion 156, the coupling with the cap 165 may not be easy. Accordingly, the blade 170 may be disposed such that the other end 173 thereof is spaced apart from the contact surface between the cap-coupled-portion 156 and the pillar main body 153. That is, the other end 173 of the blade 170 may be disposed to be spaced apart from the cap-coupled-portion 156. In other words, when the cap 165 is coupled at the cap-coupled-portion 156, the other end 173 of the blade 170 may be spaced apart from the cap 165.

Accordingly, the cap-coupled-portion 156 may be prevented from being deformed as much as possible during the cooling in manufacturing by the injection molding. Accordingly, the cap 165 may be easily coupled to the cap-coupled-portion 156 and the end of the pillar main body 153, and a coupling force therebetween may be increased.

The spaced distance A3 between the other end 173 of the blade 170 and the contact surface between the cap-coupled-portion 156 and the pillar main body 153 may be determined in consideration of the thickness of the blade 170, the thickness of the pillar 150, a thickness ratio of the blade 170 and the pillar 150, and the like to prevent the deformation of the cap-coupled-portion 156 as much as possible.

In one example, the spaced distance A3 between the other end 173 of the blade 170 and the cap-coupled-portion 156 is the smallest in FIG. 5B, and the spaced distance A3 between the other end 173 of the blade 170 and the cap-coupled-portion 156 is the largest in FIG. 5D.

When the cap 165 and the pillar 150 are coupled to each other, the spaced distance A3 between the other end 173 of the blade 170 and the cap-coupled-portion 156 may be the same as the spaced distance A3 between the other end 173 of the blade 170 and the cap 165.

Referring to FIG. 5B, 5C, 5D, as the spaced distance A3 increases, the deformation of the pillar 150 may be reduced. That is, as the spaced distance A3 increases, the deformation of the cap-coupled-portion 156 may be reduced.

However, when the spaced distance A3 becomes too large, the length of the blade 170 in the longitudinal direction L of the pillar 150 may be reduced. Accordingly, the blade 170 may not sufficiently generate the water flow. In addition, the laundry may not be sufficiently agitated.

Therefore, the spaced distance A3 may be set in consideration of the thickness of the blade 170, the thickness of the pillar 150, the thickness ratio of the blade 170 and the pillar 150, the thickness of the cap-coupled-portion 156, the height of the blade 170, and the like. The optimal spaced distance A3 determined in consideration of the above factors may be the predetermined distance A1 according to an embodiment of the present disclosure described above with reference to FIG. 4.

In other words, when the spaced distance A3 between the other end 173 of the blade 170 and the contact surface between the pillar main body 153 and the cap-coupled-portion 156 is the predetermined distance A1, the cap-coupled-portion 156 may be prevented from being deformed as much as possible.

Figure 6:
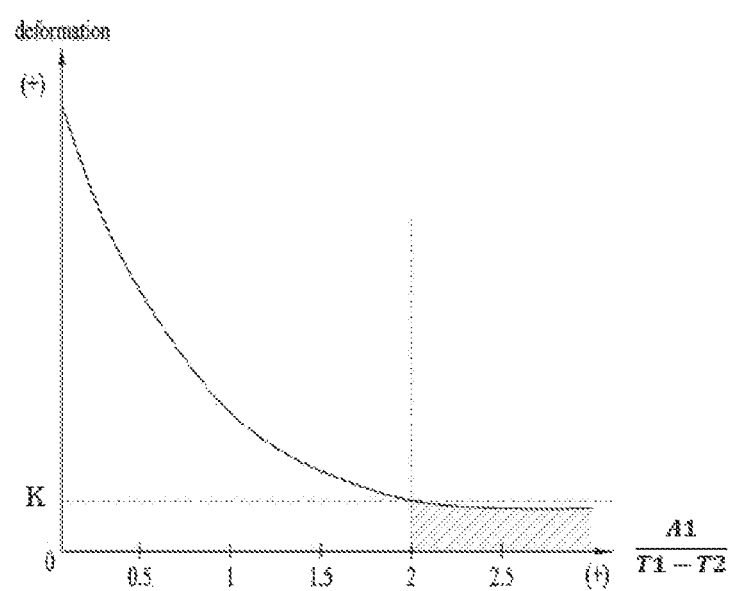
FIG. 6 is a graph showing a degree of deformation of a pillar based on a thickness difference and a degree of spacing between a blade and the pillar.
Figure 7A:
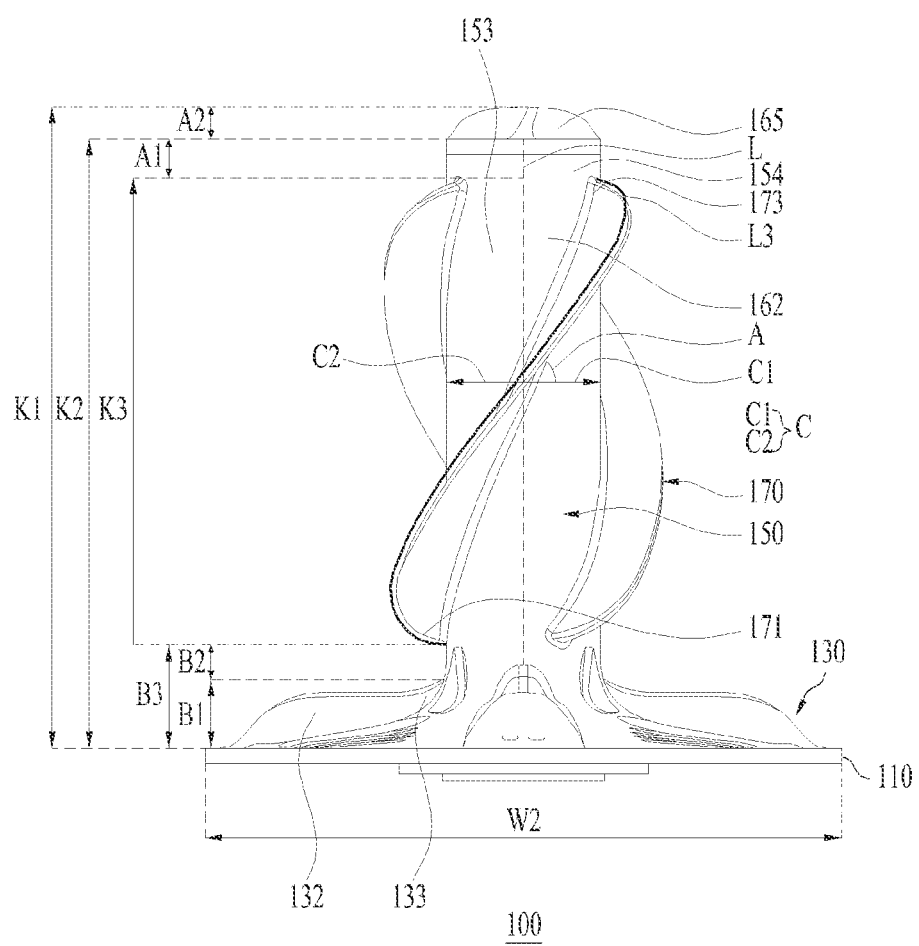
FIGS. 7A to 7B are views showing a rotator in a laundry treating apparatus according to an embodiment of the present disclosure viewed from the side.
Figure 7B:
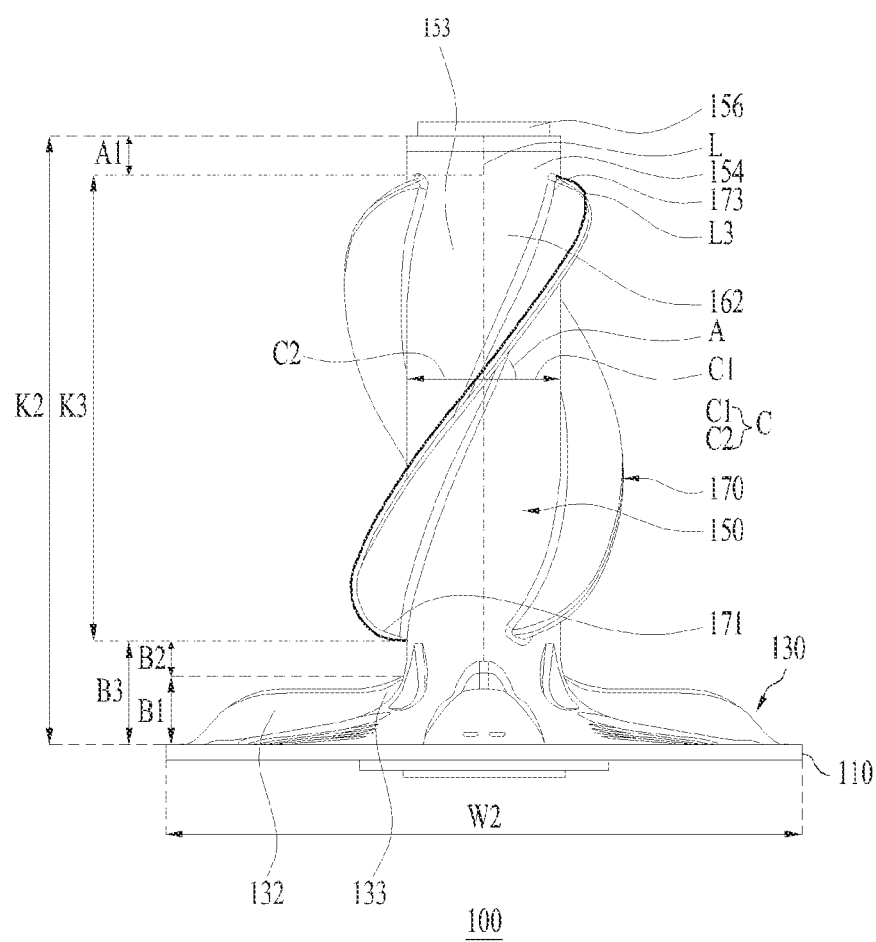

FIG. 6 is a graph showing a degree of deformation of a pillar based on a thickness difference and a degree of spacing between a blade and the pillar. FIG. 7 is a view showing a rotator in a laundry treating apparatus according to an embodiment of the present disclosure viewed from the side. Specifically, FIG. 7A shows a view of a rotator in a state in which a cap is coupled thereto viewed from the side, and FIG. 7B shows a view of a rotator in a state in which a cap is separated therefrom viewed from the side.

Referring to FIGS. 5A to 5D, 6, and 7A to 7B, as described above in the treating apparatus according to an embodiment of the present laundry disclosure, the pillar 150 and the blade 170 may be integrally manufactured by the injection molding. Accordingly, during the cooling process, the pillar 150 and the blade 170 may be deformed. In particular, the large deformation may occur at the end of the pillar 150. That is, the large deformation may occur at the end of the pillar main body 153 and the cap-coupled-portion 156.

In one embodiment of the present disclosure, in order to prevent the deformation of the pillar 150 and the blade 170 as much as possible. the other end 173 of the blade 170 may be disposed to be spaced apart from the contact surface between the pillar main body 153 and the cap-coupled-portion 156 by the predetermined distance A1 in the longitudinal direction L of the pillar 150.

Referring to FIG. 5, as described above, the blade 170 may have the largest thickness T1 at a portion thereof that starts to protrude from the pillar main body 153. In addition, the pillar main body 153 may have the smallest thickness T2 at a portion thereof in contact with the cap-coupled-portion 156. That is, the thickness T1 of the portion of the blade 170 that starts to protrude from the pillar main body 153, and the thickness T2 of the portion of the pillar main body 153 in contact with the cap-coupled-portion 156 may have the greatest effect on the deformation during the cooling process in the manufacturing.

Hereinafter, in describing one embodiment of the present disclosure, the thickness of the blade 170 will be described as the thickness T1 of the portion of the blade 170 that starts to protrude from the pillar main body 153, and the thickness of the pillar main body 153 will be described as the thickness T2 of the portion of the pillar main body 153 in contact with the cap-coupled-portion 156

By design, the thickness T1 of the blade 170 may be set to a thickness for forming the three-dimensional water flow when the rotator 100 rotates. In addition, by design, the thickness T2 of the pillar main body 153 may be set to a thickness capable of maintaining the structural rigidity while reducing the amount of material used. That is, by design, the thickness T1 of the blade 170 and the thickness T2 of the pillar main body may be variously set.

Accordingly, the predetermined distance A1 may increase as the difference between the thickness T1 of the blade 170 and the thickness T2 of the pillar main body 153 increases. However, when the predetermined distance A1 is excessively increased to prevent the deformation, the length of the blade 170 in the longitudinal direction L of the pillar 150 may be reduced. Accordingly, the blade 170 may not sufficiently generate the water flow. In addition, the laundry may not be sufficiently agitated.

Accordingly, the predetermined distance A1 may be set in consideration of the thickness of the blade 170, the thickness of the pillar 150, the thickness ratio of the blade 170 and the pillar 150, the thickness of the cap-coupled-portion 156, the height of the blade 170, and the like.

Referring to FIG. 6, an x-axis of the graph means a ratio of the predetermined distance A1 to the difference between the thickness T1 of the blade 170 and the thickness T2 of the pillar main body 153, and a y-axis means an amount of deformation in terms of roundness of the cap-coupled-portion 156.

A coupling limit value K shown on the y-axis may mean a minimum value at which the cap 165 may be coupled to the pillar 150. The coupling limit value K may be determined as a result of repeated experiments or of theoretical calculation. In addition, the roundness may mean deformation of the pillar 150 in a radial direction. That is, the roundness may mean a difference in the radial direction of the pillar 150 between a portion protruding the most in the radial direction of the pillar 150 and a portion protruding the most in the central direction of the pillar 150.

The rotator 100 may have the coupling limit value K when the ratio of the predetermined distance A1 to the difference between the thickness T1 of the blade 170 and the thickness T2 of the pillar main body 153 is 2. That is, when the ratio of the predetermined distance A1 to the difference between the thickness T1 of the blade 170 and the thickness T2 of the pillar main body 153 is equal to or greater than 2, the cap 165 may be easily coupled to the pillar 150.

In other words, the predetermined distance A1 may be at least twice the difference between the thickness T1 of the blade 170 and the thickness of the pillar main body 153. Accordingly, even when the cap-coupled-portion 156 and the end of the pillar main body 153 are deformed during the cooling process in the manufacturing, the cap 165 may be easily coupled to the pillar 150.

For example, the thickness T1 of the blade 170 may be in a range from 11 mm to 13 mm. In addition, the thickness T2 of the pillar main body 153 may be in a range from 4 mm to 5 mm. In this case, the difference between the thickness T1 of the blade 170 and the thickness T2 of the pillar main body 153 may be determined to be in a range from 6 mm to 9 mm. Accordingly, the predetermined distance A1 may be set to be equal to or greater than 12 mm. In addition, the predetermined distance A1 may be set to be equal to or greater than 18 mm. For example, the predetermined distance A1 may be set to be in a range from 22 mm to 23 mm such that the water flow may be strongly formed by the blade 170 while the cap 165 has a strong coupling force with the pillar 150.

Referring to FIGS. 7A to 7B, in the laundry treating apparatus according to an embodiment of the present disclosure, the pillar main body 153 may have a height K2 in the longitudinal direction L of the pillar 150 from the bottom portion 110. When the cap 165 and the pillar 150 are coupled to each other, the rotator 100 may have a height K1 in the longitudinal direction L of the pillar 150 from the bottom portion 110. In addition, the blade 170 may have a height K3 in the longitudinal direction L of the pillar.

In addition, as described above, the other end 173 of the blade 170 may be spaced apart from the contact surface between the pillar main body 153 and the cap-coupled-portion 156 by the predetermined distance A1. The predetermined distance A1 may be determined such that the deformation of the end of the pillar main body 153 and the cap-coupled-portion 156 may be prevented as much as possible during the cooling process in the manufacturing, and the formation of the water flow by the blade 170 during the washing may become easy.

Accordingly, the predetermined distance A1 may be set to be at least 0.05 times the height K2 of the pillar main body 153 such that the deformation of the end of the pillar main body 153 and the cap-coupled-portion 156 may be prevented as much as possible during the cooling process in the manufacturing. In addition, the predetermined distance A1 may be set to be at least 0.06 times the height K2 of the pillar main body 153 such that the height K3 of the blade 170 may be secured to be equal to or higher than a certain value to facilitate the formation of the water flow during the washing.

For example, the pillar main body 153 may have the height K2 in a range from 300 mm to 500 mm. Accordingly, the predetermined distance A1 may be in a range from 20 mm to 24 mm when the height of the pillar main body 153 is 400 mm. However, the predetermined distance A1 may not be interpreted as being limited thereto, and the predetermined distance A1 may be determined in consideration of a diameter of the drum 30, a washing capacity of the laundry treating apparatus 1, the thickness of the blade 170, the thickness of the pillar main body 153, the thickness ratio of the blade 170 and the pillar main body 153, and the like.

Figure 8A:
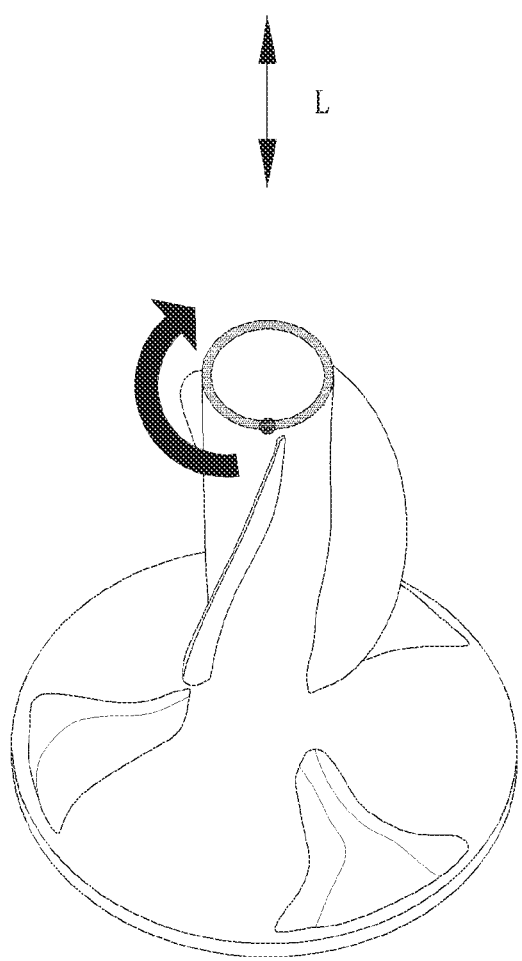
FIGS. 8A to 8C and 9A to 9C are graphs showing deformation of a cap-coupled-portion based on a degree of spacing of a blade and a cap-coupled-portion.
Figure 8B:
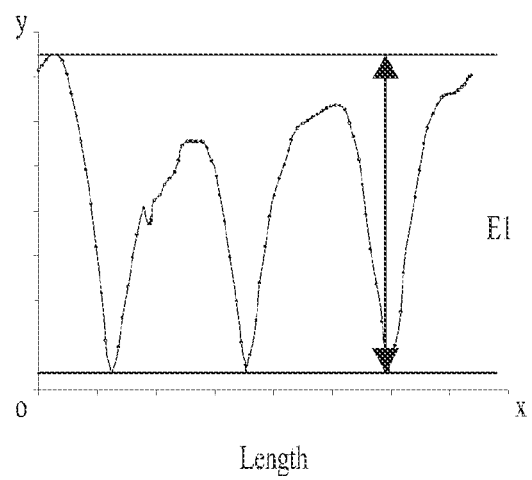
Figure 8C:
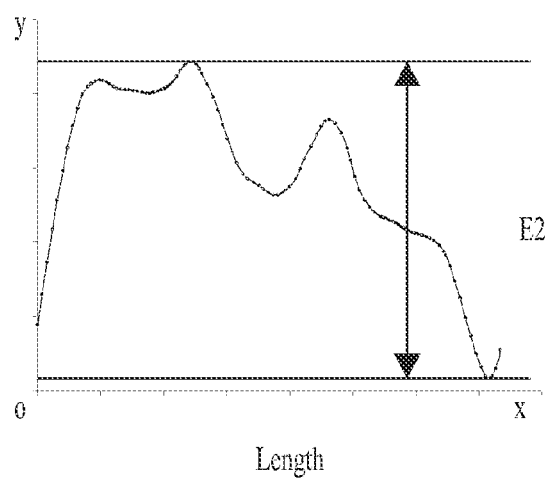
Figure 9A:
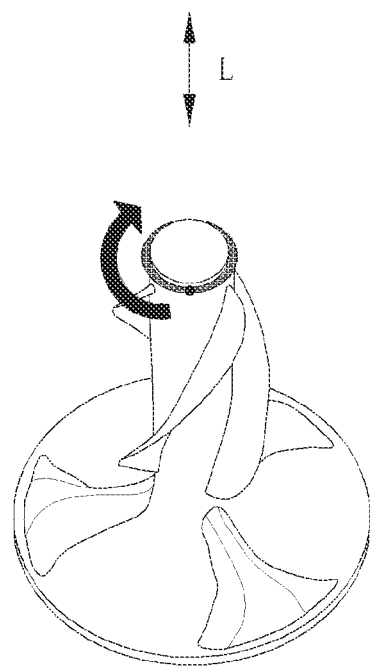
Figure 9B:
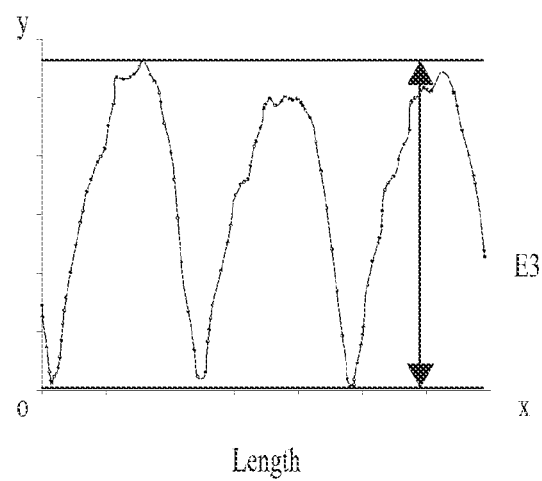
Figure 9C:
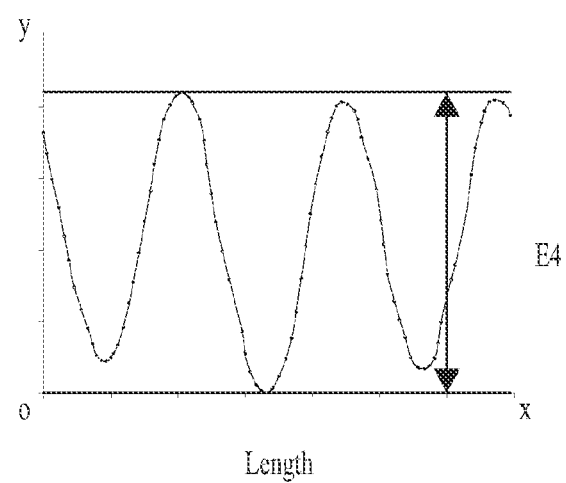

FIGS. 8A to 8C and 9A to 9C are graphs showing deformation of a cap-coupled-portion based on a degree of spacing of a blade and a cap-coupled-portion. FIGS. 8A to 8C show views and graphs showing deformation of a cap-coupled-portion resulted from cooling during manufacturing of a rotator when a blade and a cap-coupled-portion are not spaced apart from each other. FIGS. 9A to 9C show views and graphs showing deformation of a cap-coupled-portion resulted from cooling during manufacturing of a rotator when a blade and a cap-coupled-portion are spaced apart from each other.

Specifically, FIG. 8A shows the rotator in a case in which the blade and the cap-coupled-portion are not spaced apart from each other, FIG. 8B shows deformation based on flatness of the cap-coupled-portion 156 during cooling along a circumference of the cap-coupled-portion 156, and FIG. 8C shows deformation based on roundness of the cap-coupled-portion 156 during the cooling of the cap-coupled-portion 156 along the circumference of the cap-coupled-portion 156.

Specifically, FIG. 9A shows the rotator in the case in which the blade and the cap-coupled-portion are spaced apart from each other, FIG. 9B shows the deformation based on the flatness of the cap-coupled-portion 156 during the cooling along the circumference of the cap-coupled-portion 156, and FIG. 9C shows the deformation based on the roundness of the cap-coupled-portion 156 during the cooling of the cap-coupled-portion 156 along the circumference of the cap-coupled-portion 156.

The flatness may mean the deformation of the pillar 150 in the longitudinal direction L. That is, the flatness may mean a difference in the longitudinal direction L of the pillar 150 between a portion protruding the most in a direction toward the open surface 31 and a portion protruding the most in a direction toward the bottom surface 33.

The roundness may mean deformation of the pillar 150 in the radial direction. The roundness may mean a difference in the radial direction of the pillar 150 between a portion protruding the most in the radial direction of the pillar 150 and a portion protruding the most in the central direction of the pillar 150.

x-axes of the graphs shown in FIG. 8B and FIG. 9B represent a length along the circumference of the cap-coupled-portion 156 at one point of the cap-coupled-portion 156. In addition, y-axis values respectively represent a length of the cap-coupled-portion 156 protruding toward the open surface 31 and a length of the cap-coupled-portion 156 protruding toward the bottom surface 33.

x-axes of the graphs shown in FIG. 8C and FIG. 9C represent the length along the circumference of the cap-coupled-portion 156 at one point of the cap-coupled-portion 156. In addition, y-axis values respectively represent a length of the cap-coupled-portion 156 protruding in the radial direction of the pillar 150 and a length of the cap-coupled-portion 156 protruding in the central direction of the pillar 150.

Referring to FIG. 8A, the blade 170 may extend from the other end 173 thereof to one end facing toward the open surface 31 of the pillar main body 153. That is, the other end 173 of the blade 170 may not be spaced apart from the cap 165 in the longitudinal direction of the pillar 150. In other words, the other end 173 of the blade 170 may be connected to the cap 165.

Referring to FIG. 9A, the other end 173 of the blade 170 may be spaced apart from the cap-coupled-portion 156. That is, when the cap 165 is coupled to the pillar 150, the other end 173 of the blade 170 may be spaced apart from the cap 165.

Referring to FIG. 8B, in the cap-coupled-portion 156, a difference in the longitudinal direction L of the pillar 150 between the portion protruding the most in the direction toward the open surface 31 and the portion protruding the most in the direction toward the bottom surface 33 is represented as a first deformation distance E1.

Referring to FIG. 9B, in the cap-coupled-portion 156, a difference in the longitudinal direction L of the pillar 150 between the portion protruding the most in the direction toward the open surface 31 and the portion protruding the most in the direction toward the bottom surface 33 is represented as a third deformation distance E3.

The first deformation distance E1 represents a larger value than the third deformation distance E3. That is, when the other end 173 of the blade 170 is spaced apart from the cap-coupled-portion 156, it may be seen in that the cap-coupled-portion 156 is less deformed in the longitudinal direction L of the pillar 150. In other words, when the other end 173 of the blade 170 is spaced apart from the cap-coupled-portion 156, the cap-coupled-portion 156 may be flat during the cooling process in the manufacture of the rotator 100.

Referring to FIG. 8C, in the cap-coupled-portion 156, a difference in the radial direction of the pillar 150 between the portion of the pillar 150 that protrudes the most in the radial direction and the portion that protrudes the most in the central direction of the pillar 150 is represented as a second deformation distance E2.

Referring to FIG. 9C, in the cap-coupled-portion 156, a difference in the radial direction of the pillar 150 between the portion of the pillar 150 that protrudes the most in the radial direction and the portion that protrudes the most in the central direction of the pillar 150 is represented as a fourth deformation distance E4.

The second deformation distance E2 represents a larger value than the fourth deformation distance E4. That is, when the other end 173 of the blade 170 is spaced apart from the cap-coupled-portion 156, it may be seen in that the cap-coupled-portion 156 is less deformed in the radial direction of the pillar 150. In other words, when the other end 173 of the blade 170 is spaced apart from the cap-coupled-portion 156, the cap-coupled-portion 156 may be round during the cooling process in the manufacture of the rotator 100.

FIGS. 10A to 10H show graphs showing deformation of the cap-coupled-portion based on a thickness of the cap-coupled-portion. Specifically, FIG. 10A to 10D show deformation of the cap-coupled-portion based on the thickness of the cap-coupled-portion during the cooling process in the manufacture of the rotator in terms of the flatness when the blade and the cap-coupled-portion are not spaced apart from each other, and FIG. 10E to 10H show deformation of the cap-coupled-portion based on the thickness of the cap-coupled-portion during the cooling process in the manufacture of the rotator in terms of the roundness when the blade and the cap-coupled-portion are spaced apart from each other.

The flatness may mean the deformation of the pillar 150 in the longitudinal direction L. That is, the flatness may mean the difference in the longitudinal direction L of the pillar 150 between the portion protruding the most in the direction toward the open surface 31 and the portion protruding the most in the direction toward the bottom surface 33.

x-axes of graphs shown in FIG. 10A to 10D represent the length along the circumference of the cap-coupled-portion 156 at one point of the cap-coupled-portion 156. In addition, y-axis values respectively represent the length of the cap-coupled-portion 156 protruding toward the open surface 31 and the length of the cap-coupled-portion 156 protruding toward the bottom surface 33.

x-axes of graphs shown in FIG. 10E to 10H represent the length along the circumference of the cap-coupled-portion 156 at one point of the cap-coupled-portion 156. In addition, y-axis values respectively represent the length of the cap-coupled-portion 156 protruding in the radial direction of the pillar 150 and the length of the cap-coupled-portion 156 protruding in the central direction of the pillar 150.

The roundness may mean the deformation of the pillar 150 in the radial direction. The roundness may mean the difference in the radial direction of the pillar 150 between the portion protruding the most in the radial direction of the pillar 150 and the portion protruding the most in the central direction of the pillar 150.

Figure 10A:
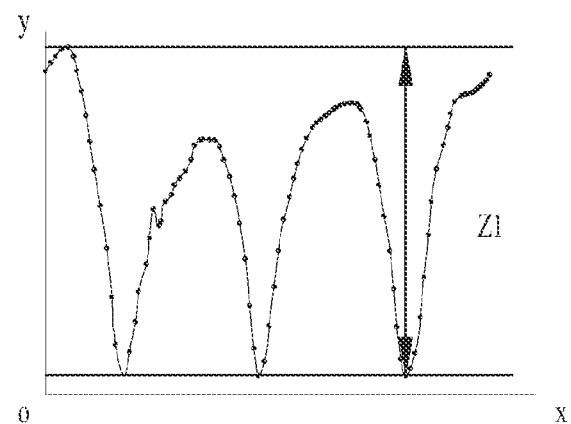
FIGS. 10A to 10H and 11A to 11D are graphs showing deformation of a cap-coupled-portion based on a thickness of a cap-coupled-portion.
Figure 10B:
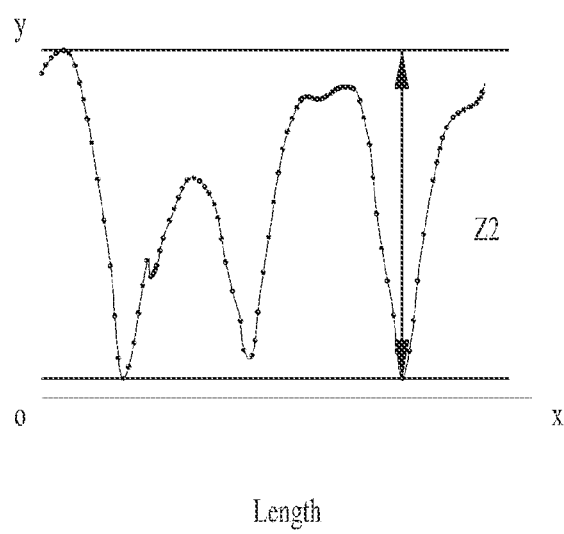
Figure 10C:
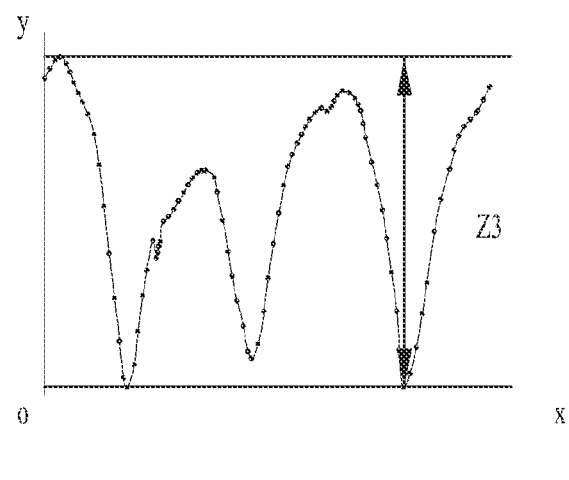
Figure 10D:
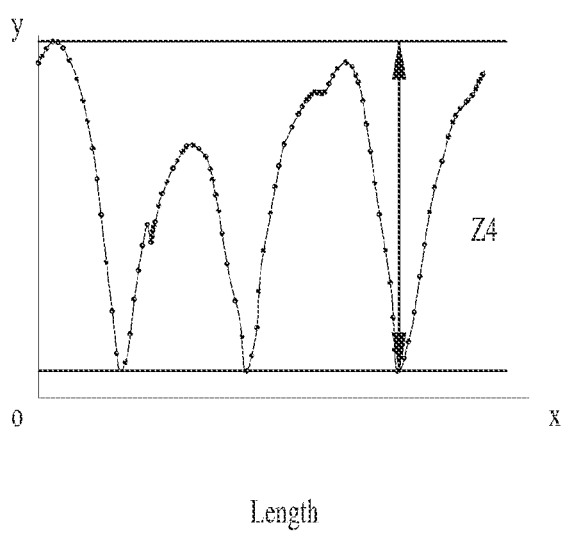

Referring to FIG. 10A to 10D, the cap-coupled-portion 156 may have the smallest thickness in FIG. 10A, and the cap-coupled-portion 156 may have the largest thickness in FIG. 10D. It may be seen that, even when the thickness of the cap-coupled-portion 156 is increased, degrees of deformation of the cap-coupled-portion 156 are similar.

That is, it may be seen that there is no significant difference in the longitudinal direction L of the pillar 150 between the portion protruding the most in the direction toward the open surface 31 and the portion protruding the most in the direction toward the bottom surface 33 of the cap-coupled-portion 156 even when the thickness of the portion 156 is changed.

In other words, referring to FIG. 10A, the cap-coupled-portion 156 has a first longitudinal changed value Z1 that is a difference in the longitudinal direction L of the pillar 150 between the portion protruding the most in the direction toward the open surface 31 and the portion protruding the most in the direction toward the bottom surface 33.

Referring to FIG. 10B, the cap-coupled-portion 156 has a second longitudinal changed value Z2 that is a difference in the longitudinal direction L of the pillar 150 between the portion protruding the most in the direction toward the open surface 31 and the portion protruding the most in the direction toward the bottom surface 33.

Referring to FIG. 10C, the cap-coupled-portion 156 has a third longitudinal changed value Z3 that is a difference in the longitudinal direction L of the pillar 150 between the portion protruding the most in the direction toward the open surface 31 and the portion protruding the most in the direction toward the bottom surface 33.

Referring to FIG. 10D, the cap-coupled-portion 156 has a fourth longitudinal changed value Z4 that is a difference in the longitudinal direction L of the pillar 150 between the portion protruding the most in the direction toward the open surface 31 and the portion protruding the most in the direction toward the bottom surface 33.

There is no significant difference between the first longitudinal changed value Z1, the second longitudinal changed value Z2, the third longitudinal changed value Z3, and the fourth longitudinal changed value Z4 compared to the degree of deformation of the cap-coupled-portion 156. That is, when the cap-coupled-portion 156 has a large thickness, large deformation may occur during the cooling process in the manufacturing.

Figure 10E:
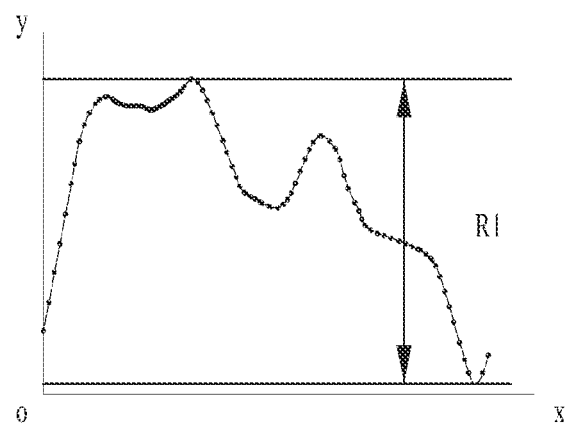
Figure 10F:
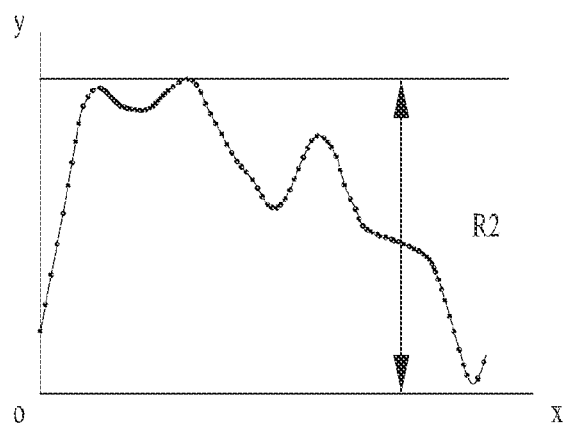
Figure 10G:
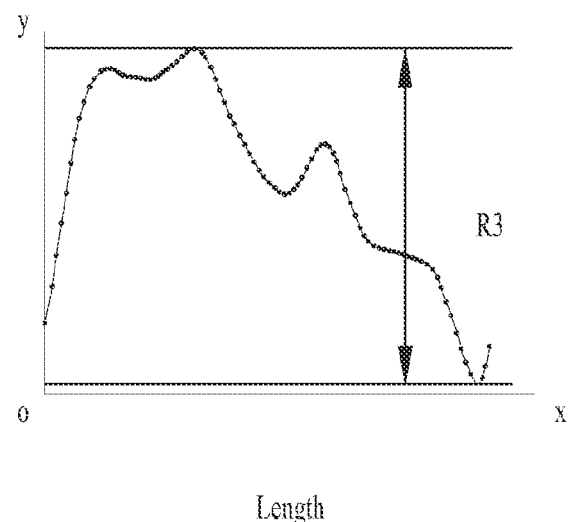
Figure 10H:
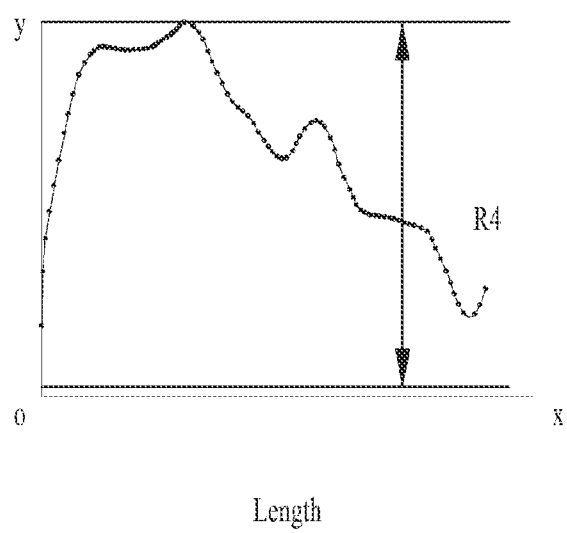

In addition, referring to FIGS. FIG. 10E to 10H, the cap-coupled-portion 156 may have the smallest thickness in FIG. 10E, and the cap-coupled-portion 156 may have the largest thickness in FIG. 10H. It may be seen that, even when the thickness of the cap-coupled-portion 156 is increased, degrees of deformation of the cap-coupled-portion 156 are similar.

That is, it may be seen that there is no significant difference in the radial direction of the pillar 150 between the portion protruding the most in the radial direction of the pillar 150 and the portion protruding the most in the central direction of the pillar 150 of the cap-coupled-portion 156 even when the thickness of the cap-coupled-portion 156 is changed.

In other words, referring to FIG. 10E, the cap-coupled-portion 156 has a first radial changed value R1 that is a difference in the radial direction of the pillar 150 between the portion protruding the most in the radial direction of the pillar 150 and the portion protruding the most in the central direction of the pillar 150.

Referring to FIG. 10F, the cap-coupled-portion 156 has a second radial changed value R2 that is a difference in the radial direction of the pillar 150 between the portion protruding the most in the radial direction of the pillar 150 and the portion protruding the most in the central direction of the pillar 150.

Referring to FIG. 10G, the cap-coupled-portion 156 has a third radial changed value R3 that is a difference in the radial direction of the pillar 150 between the portion protruding the most in the radial direction of the pillar 150 and the portion protruding the most in the central direction of the pillar 150.

Referring to FIG. 10H, the cap-coupled-portion 156 has a fourth radial changed value R4 that is a difference in the radial direction of the pillar 150 between the portion protruding the most in the radial direction of the pillar 150 and the portion protruding the most in the central direction of the pillar 150.

There is no significant difference between the first radial changed value R1, the second radial changed value R2, the third radial changed value R3, and the fourth radial changed value R4 compared to the degree of deformation of the cap-coupled-portion 156. That is, when the cap-coupled-portion 156 has the large thickness, the large deformation may occur during the cooling process in the manufacturing.

Figure 11A:
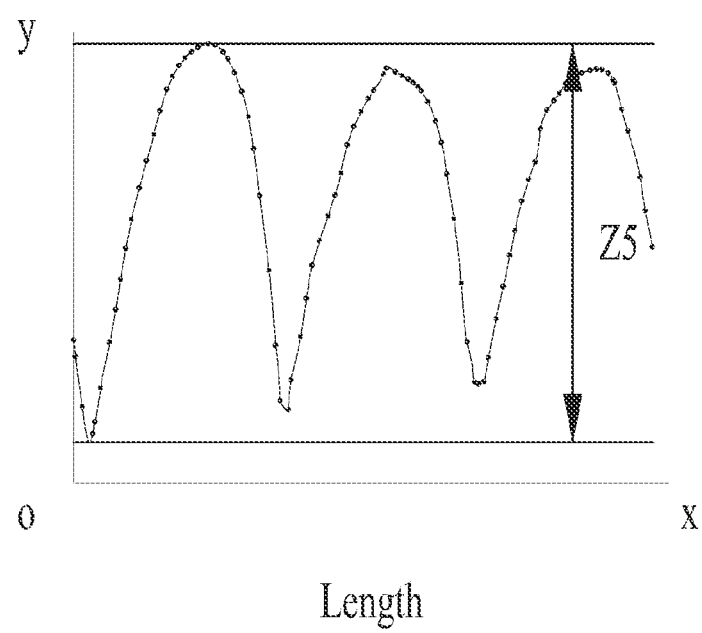
Figure 11B:
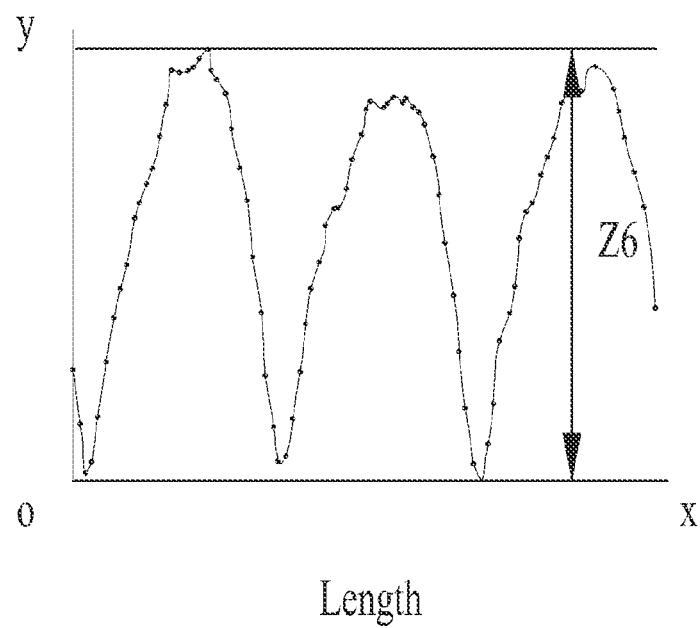
Figure 11C:
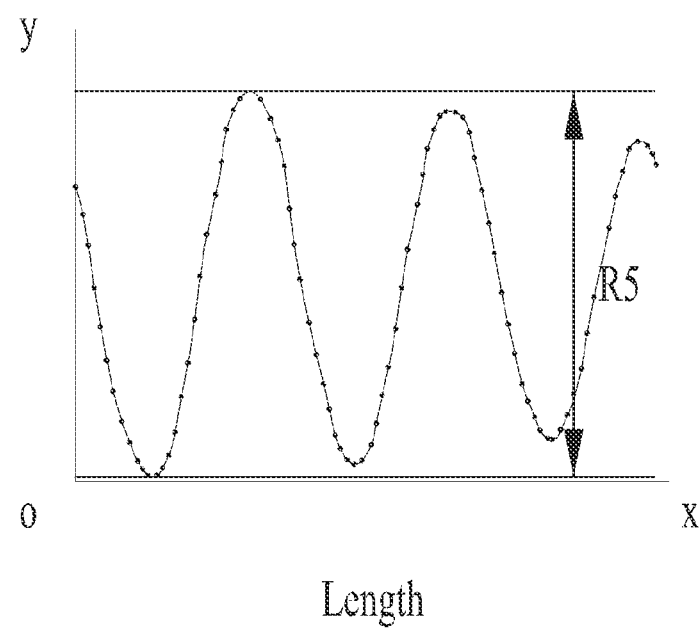
Figure 11D:
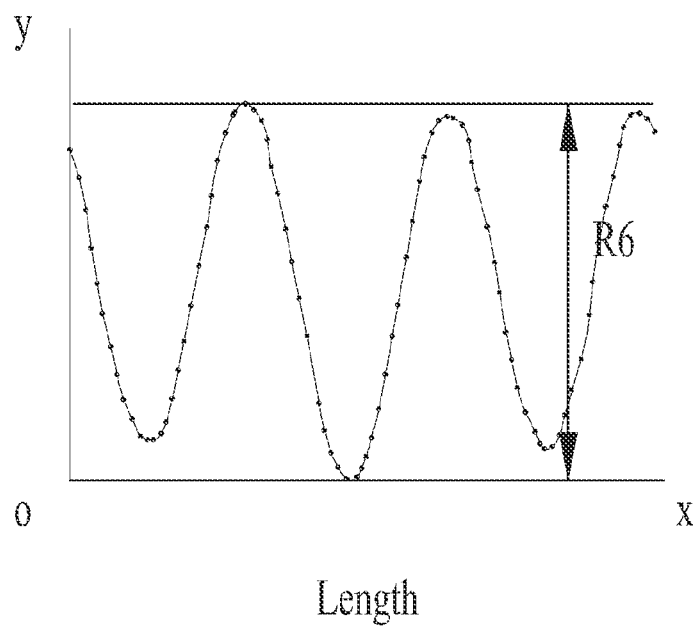

FIGS. 11A to 11D show graphs showing deformation of the cap-coupled-portion based on a thickness of the cap-coupled-portion. Specifically, FIGS. 11A and 11B show deformation of the cap-coupled-portion based on the thickness of the cap-coupled-portion during the cooling process in the manufacture of the rotator in terms of the flatness when the blade and the cap-coupled-portion are spaced apart from each other, and FIGS. 11C and 11D show deformation of the cap-coupled-portion based on the thickness of the cap-coupled-portion during the cooling process in the manufacture of the rotator in terms of the roundness when the blade and the cap-coupled-portion are spaced apart from each other.

The flatness may mean the deformation of the pillar 150 in the longitudinal direction L. That is, the flatness may mean the difference in the longitudinal direction L of the pillar 150 between the portion protruding the most in the direction toward the open surface 31 and the portion protruding the most in the direction toward the bottom surface 33.

The roundness may mean the deformation of the pillar 150 in the radial direction. The roundness may mean the difference in the radial direction of the pillar 150 between the portion protruding the most in the radial direction of the pillar 150 and the portion protruding the most in the central direction of the pillar 150.

x-axes of graphs shown in FIGS. 11A and 11B represent the length along the circumference of the cap-coupled-portion 156 at one point of the cap-coupled-portion 156. In addition, y-axis values respectively represent the length of the cap-coupled-portion 156 protruding toward the open surface 31 and the length of the cap-coupled-portion 156 protruding toward the bottom surface 33.

x-axes of graphs shown in FIGS. 11C and 11D represent the length along the circumference of the cap-coupled-portion 156 at one point of the cap-coupled-portion 156. In addition, y-axis values respectively represent the length of the cap-coupled-portion 156 protruding in the radial direction of the pillar 150 and the length of the cap-coupled-portion 156 protruding in the central direction of the pillar 150.

Referring to FIGS. 10A and 10B, the cap-coupled-portion 156 may have the small thickness in FIG. 11A, and the cap-coupled-portion 156 may have the large thickness in FIG. 11B. It may be seen that, even when the thickness of the cap-coupled-portion 156 is increased, degrees of deformation of the cap-coupled-portion 156 are similar.

That is, it may be seen that there is no significant difference in the longitudinal direction L of the pillar 150 between the portion protruding the most in the direction toward the open surface 31 and the portion protruding the most in the direction toward the bottom surface 33 of the cap-coupled-portion 156 even when the thickness of the portion 156 is changed.

In other words, referring to FIG. 11A, the cap-coupled-portion 156 has a fifth longitudinal changed value Z5 that is a difference in the longitudinal direction L of the pillar 150 between the portion protruding the most in the direction toward the open surface 31 and the portion protruding the most in the direction toward the bottom surface 33.

Referring to FIG. 11B, the cap-coupled-portion 156 has a sixth longitudinal changed value Z6 that is a difference in the longitudinal direction L of the pillar 150 between the portion protruding the most in the direction toward the open surface 31 and the portion protruding the most in the direction toward the bottom surface 33. There is no significant difference between the fifth longitudinal changed value Z5 and the sixth longitudinal changed value Z6 compared to the degree of deformation of the cap-coupled-portion 156.

In addition, referring to FIGS. 11C and 11D, the cap-coupled-portion 156 may have the smallest thickness in FIG. 11C, and the cap-coupled-portion 156 may have the largest thickness in FIG. 11D. It may be seen that, even when the thickness of the cap-coupled-portion 156 is increased, degrees of deformation of the cap-coupled-portion 156 are similar.

That is, it may be seen that there is no significant difference in the radial direction of the pillar 150 between the portion protruding the most in the radial direction of the pillar 150 and the portion protruding the most in the central direction of the pillar 150 of the cap-coupled-portion 156 even when the thickness of the cap-coupled-portion 156 is changed.

In other words, referring to FIG. 11C, the cap-coupled-portion 156 has a fifth radial changed value R5 that is a difference in the radial direction of the pillar 150 between the portion protruding the most in the radial direction of the pillar 150 and the portion protruding the most in the central direction of the pillar 150.

Referring to FIG. 11D, the cap-coupled-portion 156 has a sixth radial changed value R6 that is a difference in the radial direction of the pillar 150 between the portion protruding the most in the radial direction of the pillar 150 and the portion protruding the most in the central direction of the pillar 150. There is no significant difference between the fifth radial changed value R5 and the sixth radial changed value R6 compared to the degree of deformation of the cap-coupled-portion 156.

In one example, referring to FIGS. 10A and 10B and FIGS. 11A and 11B, the cap-coupled-portion 156 has the same thickness in FIG. 10A and FIG. 11A. In addition, the cap-coupled-portion 156 has the same thickness in FIG. 10B and FIG. 11B. In this connection, the first longitudinal changed value Z1 has a greater value than the fifth longitudinal changed value Z5. In addition, the second longitudinal changed value Z2 has a greater value than the sixth longitudinal changed value Z6.

Referring to FIG. 10E to 10F and FIGS. 11C and 11D, the cap-coupled-portion 156 has the same thickness in FIG. 10E and FIG. 11C. In addition, the cap-coupled-portion 156 has the same thickness in FIG. 10F and FIG. 11D. In this connection, the first radial changed value R1 has a larger value than the fifth radial changed value R5. In addition, the second radial changed value R2 has a larger value than the sixth radial changed value R6.

That is, it may be seen that the deformation of the cap-coupled-portion 156 that occurs during the cooling process when the rotator 100 is manufactured is greatly affected by the degree of spacing of the other end 173 of the blade 170 from the cap-coupled-portion 156 rather than the thickness of the cap-coupled-portion 156.

Therefore, the deformation of the end of the pillar 150 and the cap-coupled-portion 156 may be prevented as much as possible during the cooling process in the manufacture of the rotator 100 by adjusting the thickness of the cap-coupled-portion 156. However, as described above, it may be said that it is desirable to prevent the deformation of the end of the pillar 150 and the cap-coupled-portion 156 by spacing the other end 173 of the blade 170 apart from the cap-coupled-portion 156 as described above.

Figure 12:
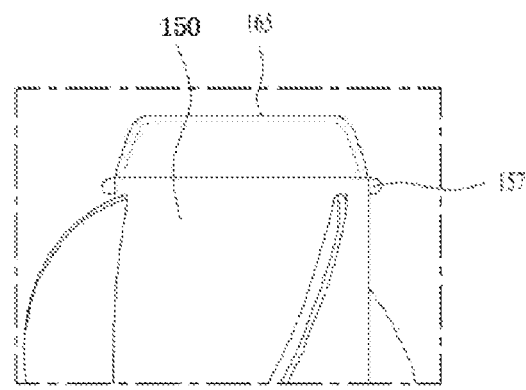
FIG. 12 is a view showing a pillar protrusion disposed on a pillar in a laundry treating apparatus according to an embodiment of the present disclosure.

FIG. 12 is a view showing a pillar protrusion disposed on a pillar in a laundry treating apparatus according to an embodiment of the present disclosure. Referring to FIG. 12, the treating apparatus 1 according to an embodiment of the present laundry disclosure may have a pillar protrusion 157 disposed on the pillar 150. The pillar protrusion 157 may protrude from the end of the pillar 150 in the radial direction of the pillar 150.

That is, the other end 173 of the blade 170 may be spaced apart from the cap-coupled-portion 156. The other end 173 may be disposed to be spaced apart from the end of the pillar 150.

The pillar protrusion 157 may be disposed on the outer circumferential surface 162 of the pillar 150 formed between the blade 170 and the cap-coupled-portion 156. That is, when the cap 165 is coupled to the end of the pillar 150, the pillar protrusion 157 may be disposed between the other end 173 of the blade 170 and the cap 165.

The pillar protrusion 157 may reduce a thickness difference between the pillar 150 and the blade 170 at the end of the pillar 150. Accordingly, the deformation of the rotator 100 caused by the thickness difference during the cooling process in the manufacture of the rotator 100 may be prevented as much as possible.

That is, the pillar protrusion 157 may prevent the deformation of the cap-coupled-portion 156 as much as possible. Accordingly, when the rotator 100 is manufactured, the cap 165 and the pillar 150 may be easily coupled to each other. In addition, the coupling force between the cap 165 and the pillar 150 may be increased.

A plurality of pillar protrusions 157 may be disposed to be spaced apart from each other in the circumferential direction of the pillar 150. In addition, the pillar protrusion 157 may be disposed in a straight line of the other end 173 of the blade 170 in the longitudinal direction L of the pillar 150.

When the rotator 100 is manufactured, the greatest deformation may occur on the outer circumferential surface 162 of the pillar 150 on which the other end 173 of the blade 170 is disposed. Accordingly, the pillar protrusion 157 may be disposed in the straight line with the other end 173 of the blade 170 to reduce the thickness difference between the pillar 150 and the blade 170.

Accordingly, the pillar protrusion 157 may effectively reduce the deformation of the rotator 100 that occurs during the cooling process in the manufacture of the rotator 100.

Figure 13:
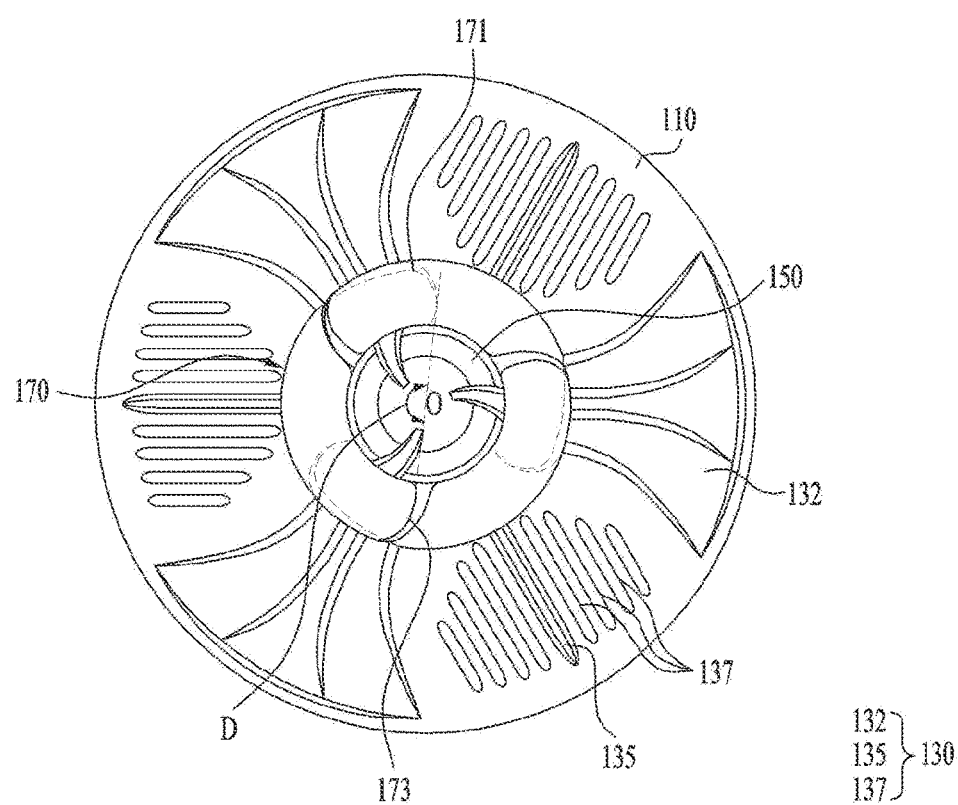
FIG. 13 is a view of a protrusion portion formed on a bottom portion of a rotator in a laundry treating apparatus according to an embodiment of the present disclosure viewed from the top.

FIG. 13 is a view of a protrusion formed on a bottom portion of a rotator in a laundry treating apparatus according to an embodiment of the present disclosure viewed from the top, and FIG. 5 is a view of a protrusion formed on a bottom portion of a rotator in a laundry treating apparatus according to an embodiment of the present disclosure viewed from the side.

Figure 14:
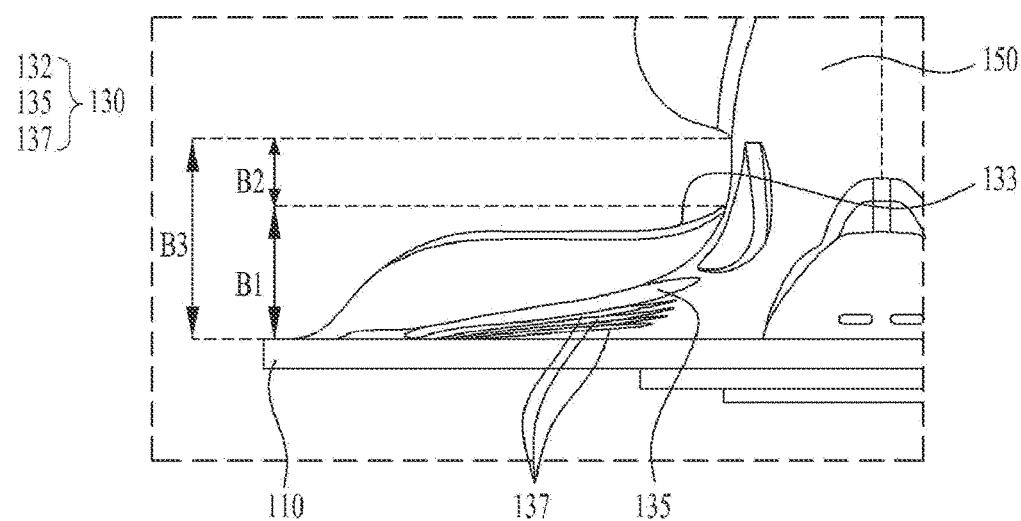
FIG. 14 is a view of a protrusion portion formed on a bottom portion of a rotator in a laundry treating apparatus according to an embodiment of the present disclosure viewed from the side.

Referring to FIGS. 13 and 14, the laundry treating apparatus 1 according to an embodiment of the present disclosure may further include the protrusion portion 130. The protrusion portion 130 may protrude from the bottom portion 110 toward the open surface 31, extend along a radial direction of the bottom portion 110, and may include a plurality of protrusion portion s spaced apart from each other along the circumferential direction of the bottom portion 110.

The protrusion portion 130 protrudes from the bottom portion 110 toward the open surface 31, and extends along the radial direction of the bottom portion 110 to form the water flow in the water inside the tub 20 when the bottom portion 110 rotates. That is, in one embodiment of the present disclosure, when the rotator 100 is rotated, the blade 170 of the pillar 150 and the protrusion portion 130 of the bottom portion 110 may form the water flow together.

The shape of the protrusion portion 130 may vary. For example, a thickness of the protrusion portion 130 may be constant or may vary when necessary. A protruding height or an extended length of the protrusion portion 130 may also be variously determined.

In one embodiment of the present disclosure, as the protrusion portion 130 of the bottom portion 110 is disposed together with the blade 170 of the pillar 150, the blade 170 and the protrusion portion 130 form the water flow together, so that the water flow forming effect may be effectively improved. In addition, because the blade 170 and the protrusion portion 130 cooperatively form the water flow, the washing effect by the water flow may be increased and the shape of the water flow may be improved.

In one example, FIG. 14 shows the protrusion portion 130 shown in FIG. 13 as viewed from the side, that is, the circumferential direction of the bottom portion 110. Referring to FIGS. 13 and 14, in one embodiment of the present disclosure, at least two of the plurality of protrusions of protrusion portion 130 may have different protruding heights from the bottom portion 110.

In one embodiment of the present disclosure, as the plurality of protrusion portion s are constructed to have different heights, when the rotator 100 is rotated, the water flow by the protrusion portion 130 may be generated in a three-dimensional form, thereby effectively improving a washing performance.

In one embodiment of the present disclosure, one of the plurality of protrusion portion s may have a protruding height of a first height, and another may have a protruding height of a second height. The first height may be greater than second height. Therefore, the protrusion of the first height may be advantageous in forming a water flow of a larger scale than the protrusion of the second height. The protrusion of the second height may contribute to stabilizing or maintaining the water flow formed by the protrusion of the first height.

In one embodiment of the present disclosure, in addition to the protrusions of the first height and the second height, the protrusions having various heights may be disposed.

In one example, referring to FIGS. 13 to 14, in one embodiment of the present disclosure, the protrusion portion 130 may include a main protrusion 132. A plurality of main protrusions 132 may be disposed and may include an inner end 133 facing the pillar 150. The inner end 133 of the main protrusion 132 may be connected to the pillar 150.

The inner end 133 of the main protrusion 132 may face the center of the bottom portion 110. That is, the inner end 133 of the main protrusion 132 may face the pillar 150. An outer end of the main protrusion 132 may face a circumferential side of the bottom portion 110. That is, the outer end of the main protrusion 132 may face the opposite side of the inner end 133.

The plurality of protrusions may include protrusions having different characteristics. The inner end 133 of the main protrusion 132 among the plurality of protrusions may be connected to the pillar 150. The main protrusion 132 may be integrally molded with the bottom portion 110 or may be separately manufactured and coupled thereto. The inner end 133 of the main protrusion 132 may be integrally formed with the pillar 150 or manufactured separately and coupled and connected to the pillar 150.

FIGS. 13 and 14 show the main protrusion 132 integrally molded with the bottom portion 110 according to an embodiment of the present disclosure, and connected to the pillar 150 as the inner end 133 thereof is integrally molded with the pillar 150.

The main protrusion 132 may greatly contribute to the formation of the water flow among the plurality of protrusions when the bottom portion 110 rotates. For example, the main protrusion 132 may be constructed such that a protruding height B1 thereof from the bottom portion 110, which is the first height, is the greatest among the protruding heights of the plurality of protrusions, and the inner end 133 and the pillar 150 are connected to each other, so that the main protrusion 132 may greatly contribute to the formation of the water flow.

In one example, as shown in FIGS. 13 and 14, in one embodiment of the present disclosure, the protrusion portion 130 may further include a first sub-protrusion 135. There may be a plurality of first sub-protrusions 135, and each first sub-protrusion 135 may be disposed between a pair of main protrusions 132. A protruding height from the bottom portion 110 of the first sub-protrusion 135 may be smaller than that of the main protrusion 132.

The main protrusion 132 may extend from the pillar 150 to a circumference of the bottom portion 110, and the first sub-protrusion 135 may have a smaller extended length than the main protrusion 132. A protruding height of the first sub-protrusion 135 may be smaller than the protruding height B1 of the main protrusion 132.

For example, the protruding height of the first sub-protrusion 135 may correspond to the second height, the main protrusion 132 may have the protruding height B1 corresponding to the first height, and the second height may correspond to a height smaller than the first height.

The first sub-protrusion 135 may be disposed between the two main protrusions 132. The number of the main protrusions 132 and the number of first sub-protrusions 135 may be variously designed as needed. The number of the main protrusions 132 may correspond to the number of the blades 170.

FIGS. 13 and 14 show the rotator 100 having the three blades 170, having the three main protrusions 132, and having each first sub-protrusion 135 between a pair of main protrusions 132, which is a total of three first sub-protrusions 135, according to an embodiment of the present disclosure.

In one embodiment of the present disclosure, as the number of the protrusions disposed on the bottom portion 110 increases, it may be advantageous to form the water flow. However, when the plurality of protrusions are made of only the main protrusions 132, the number of the main protrusions 132 may be limited by a size of the main protrusions 132. As a distance between the main protrusions 132 becomes smaller, a space between the main protrusions 132 may not affect the water flow formation and may adversely affect an increase in a washing capacity, such as forming an unnecessary vortex.

In one embodiment of the present disclosure, as the first sub-protrusion 135 rather than the main protrusion 132 is disposed between the pair of main protrusions 132, the space between the pair of main protrusions 132 may be sufficiently secured. In the space between the pair of main protrusions 132, the first sub-protrusion 135 flows the water, which is advantageous for the formation of the water flow.

Shapes of the main protrusion 132 and the first sub-protrusion 135 may vary when need. FIG. 13 shows a state in which the main protrusion 132 has a streamline-shaped side surface, and the first sub-protrusion 135 is formed in a rib shape according to an embodiment of the present disclosure.

The main protrusion 132 may be constructed such that a width thereof in the circumferential direction of the bottom portion 110 increases from the inner end 133 toward the outer end 134, and an increase rate of the width may increase toward the outer end 134.

That is, the main protrusion 132 may have a shape of a whale tail that increases in width toward the circumference of the bottom portion 110 and have a side surface forming a concave curved surface. The main protrusion 132 having the whale tail shape may reduce resistance by water when the bottom portion 110 rotates, and may improve fluidity of water. Because the water flow flowing by the main protrusion 132 may flow to said one end 171 of the blade 170, it may be advantageous to form the water flow.

The first sub-protrusion 135 may be formed in a shape of a rib extending from the pillar 150 to the circumference of the bottom portion 110. However, the shapes of the main protrusion 132 and the first sub-protrusion 135 are not necessarily limited as described above, and may be variously designed as needed.

In one example, as shown in FIGS. 13 and 14, in one embodiment of the present disclosure, the protrusion portion 130 may further include a second sub-protrusion 137. The second sub-protrusion 137 may be disposed between the main protrusion 132 and the first sub-protrusion 135, and a protruding height from the bottom portion 110 of the second sub-protrusion 137 may be smaller than that of the first sub-protrusion 135.

The second sub-protrusion 137 may be disposed between one main protrusion 132 and one first sub-protrusion 135 positioned adjacent to said one main protrusion 132. That is, the second sub-protrusion 137 may be disposed between the main protrusion 132 and the first sub-protrusion 135.

The second sub-protrusion 137 may be integrally formed with the bottom portion 110 or manufactured separately and coupled to the bottom portion 110. FIGS. 13 and 14 show the second sub-protrusion 137 integrally formed with the bottom portion 110 according to an embodiment of the present disclosure.

The second sub-protrusion 137 may have a smaller protruding height than the first sub-protrusion 135. For example, in one embodiment of the present disclosure, the protruding height B1 of the main protrusion 132 may correspond to the first height, the protruding height of the first sub-protrusion 135 may correspond to the second height smaller than the first height, and the protruding height of the second sub-protrusion 137 may correspond to a third height smaller than the second height.

That is, in one embodiment of the present disclosure, the plurality of protrusions may have the main protrusion 132, the first sub-protrusion 135, and the second sub-protrusion 137 having the different heights. Accordingly, the water flow by the bottom portion 110 may be formed three-dimensionally and effectively.

In one example, referring to FIG. 13, in one embodiment of the present disclosure, a plurality of second sub-protrusions 137 may be disposed between the main protrusion 132 and the first sub-protrusion 135, and an extended length thereof may increase as being closer to the first sub-protrusion 135.

The number of the second sub-protrusions 137 disposed between one main protrusion 132 and one first sub-protrusion 135 may be variously determined as needed. FIG. 13 shows a state in which four second sub-protrusions 137 are disposed between each main protrusion 132 and each first sub-protrusion 135 according to an embodiment of the present disclosure.

Lengths of the plurality of second sub-protrusions 137 disposed between one main protrusion 132 and one first sub-protrusion 135 may increase in a direction toward the first sub-protrusion 135 and decrease in a direction toward the main protrusion 132.

Accordingly, the plurality of second sub-protrusions 137 may continuously complement the flow of water between the main protrusion 132 and the first sub-protrusion 135 to improve fluidity.

The second sub-protrusion 137 may have an extending direction parallel to the first sub-protrusion 135. Accordingly, an inner end of one of the plurality of second sub-protrusions 137 located far from the first sub-protrusion 135 may not face the pillar 150.

The second sub-protrusions 137 may be disposed together with the first sub-protrusion 135 to improve the fluidity of water between the main protrusions 132.

In one example, referring to FIG. 14, in the laundry treating apparatus 1 according to an embodiment of the present disclosure, the main protrusion 132 may extend such that the inner end 133 thereof faces toward the center of the bottom portion 110, the outer end thereof faces the circumference of the bottom portion 110, and the height thereof from the bottom surface 33 decreases from the inner end 133 to the outer end. As described above, the rotator 100 may be manufactured by injection molding. In this connection, the rotator 100 may be manufactured with a sliding core. When the rotator 100 is manufactured with the sliding core, a manufacturing cost may be reduced. The main protrusion 132 may extend from the bottom surface 33 to decrease in height from the inner end 133 to the outer end, so that an undercut may not occur. Accordingly, the rotator 100 may be easily manufactured with the sliding core.

In addition, the one end 171 of the blade 170 may be disposed to be spaced apart from the inner end 133. As the inner end 133 of the main protrusion 132 and the one end 171 of the blade 170 have the spaced distance B2 therebetween along the longitudinal direction L of the pillar 150, a passage region of water may be defined between the inner end 133 of the main protrusion 132 and the one end 171 of the blade 170.

The passage region of the water corresponds to a region through which the water from which the direct flow is not formed by the blade 170 and the protrusion portion 130 passes. Accordingly, in the rotator 100, a portion of water passes the region between the blade 170 and the protrusion portion 130, so that the resistance of water may be reduced.

The main protrusion 132 may have the protruding height B1 in the longitudinal direction of the pillar 150. Accordingly, the one end 171 of the blade 170 may be spaced apart from the bottom portion 110 by a distance B3. That is, when the spaced distance B2 increases, the distance B3 between the one end 171 of the blade 170 and the bottom portion 110 increases, so that the formation of the water flow by the cooperation of the bottom portion 110 and the blade 170 may be prevented in the rotator 100. That is, the blade 170 may be prevented from effectively forming the water flow with the main protrusion 132.

Accordingly, the spaced distance B2 may be determined in consideration of the distance B3, the height B1 of the main protrusion 132, the diameter of the bottom portion 110, the length of the pillar 150, and the like.

Although the present disclosure has been illustrated and described in relation to a specific embodiment, it is understood that the present disclosure may be variously improved and changed within the scope of the technical idea of the present disclosure provided by the following claims. Therefore, the scope of the present disclosure should not be limited to the described embodiment and should be defined by the claims described later as well as the equivalents of the claims.

What is claimed is:

1. A laundry treating apparatus comprising:
    a tub configured to receive water;
    a drum rotatably disposed inside the tub, the drum having an open surface that is configured to receive laundry therethrough and a bottom surface located at an opposite side of the open surface; and
    a rotator rotatably disposed inside the drum, the rotator comprising:
        a bottom portion disposed at the bottom surface of the drum,
        a pillar that protrudes from the bottom portion toward the open surface of the drum, the pillar defining a hollow space,
        a blade that protrudes from an outer circumferential surface of the pillar and has a first end facing the bottom surface of the drum and a second end facing the open surface of the drum, the blade extending from the first end to the second end, and a cap that is coupled to an end of the pillar and closes the hollow space of the pillar, the cap being spaced apart from the second end of the blade, wherein the pillar comprises:
- a pillar main body that protrudes from a center of the bottom portion and defines the hollow space and the outer circumferential surface of the pillar, and
- a cap-coupled-portion that extends from the pillar main body toward the open surface of the drum and is coupled to the cap, wherein the cap-coupled-portion comprises:
- a plurality of cap-coupled-main bodies that are spaced apart from one another along a circumference of the pillar main body,
- a hook coupling portion disposed between a pair of cap-coupled-main bodies among the plurality of cap-coupled-main bodies, and
- a hook protrusion that protrudes from the hook coupling portion in a radial direction of the cap-coupled-main body, and wherein the cap defines a hook protrusion groove at an inner surface thereof, the hook protrusion groove being coupled to the hook protrusion.

2. The laundry treating apparatus of claim 1, wherein the blade and the pillar are integral parts of one body, and
wherein a thickness of the blade is different from a thickness of the pillar.

3. The laundry treating apparatus of claim 1, wherein the second end of the blade is spaced apart from a contact surface between the pillar main body and the cap-coupled-portion in a longitudinal direction of the pillar.

4. The laundry treating apparatus of claim 1, wherein the cap-coupled-portion defines a recess facing the hollow space of the pillar, and
wherein an outer diameter of the cap-coupled-portion is less than an outer diameter of the pillar main body.

5. The laundry treating apparatus of claim 1, wherein the hook coupling portion has a first portion facing the open surface of the drum and a second portion facing the bottom surface of the drum, and
wherein the hook protrusion is disposed at the first portion of the hook coupling portion.

6. The laundry treating apparatus of claim 4, wherein an inner circumferential surface of the cap-coupled-portion is flush with an inner circumferential surface of the pillar main body.

7. The laundry treating apparatus of claim 1, wherein an outer circumferential surface of the cap is flush with the outer circumferential surface of the pillar main body.

8. The laundry treating apparatus of claim 3, wherein the cap comprises:

a cap fitting portion coupled to the cap-coupled-portion and spaced apart from the second end of the blade by a predetermined distance in the longitudinal direction of the pillar; and a cap closing portion that extends from the cap fitting portion and closes an interior of the pillar main body.

9. The laundry treating apparatus of claim 8, wherein a ratio of the predetermined distance to a difference between a thickness of the blade and a thickness of the pillar main body is less than a limit value, and
wherein the predetermined distance is less than a length of the cap in the longitudinal direction of the pillar.

10. The laundry treating apparatus of claim 8, wherein the predetermined distance is at least twice of a difference between a thickness of the blade and a thickness of the pillar main body.

11. The laundry treating apparatus of claim 1, wherein the rotator further comprises a protrusion portion that protrudes from the bottom portion toward the open surface and is configured to generate a water flow together with the blade.

12. The laundry treating apparatus of claim 11, wherein the protrusion portion comprises a plurality of main protrusions that extend along a radial direction of the bottom portion and that are spaced apart from one another along a circumferential direction of the bottom portion.

13. The laundry treating apparatus of claim 12, wherein each of the plurality of main protrusions extends from an inner end facing a center of the bottom portion to an outer end facing a circumference of the bottom portion, and
wherein a height of each of the plurality of main protrusions from the bottom surface of the drum decreases from the inner end to the outer end.

14. The laundry treating apparatus of claim 13, wherein the first end of the blade is spaced apart from the inner end.

15. The laundry treating apparatus of claim 1, wherein the rotator comprises a plurality of blades that are spaced apart from one another along a circumferential direction of the pillar, the plurality of blades including the blade,
wherein each of the plurality of blades is inclined with respect to a longitudinal direction of the pillar and extends from a first position corresponding to the first end of the blade to a second position corresponding to the second end of the blade.

16. The laundry treating apparatus of claim 1, wherein the pillar comprises a pillar protrusion that protrudes from the end of the pillar in a radial direction of the pillar.

17. The laundry treating apparatus of claim 16, wherein the second end of the blade is spaced apart from the pillar protrusion in a circumferential direction of the pillar.

* * * * *